(12) United States Patent
Gaal et al.

(10) Patent No.: US 10,334,633 B2
(45) Date of Patent: Jun. 25, 2019

(54) NARROW BAND PHYSICAL RANDOM ACCESS CHANNEL FREQUENCY HOPPING PATTERNS AND DETECTION SCHEMES

(71) Applicant: QUALCOMM Incorporated, San Diego, CA (US)

(72) Inventors: Peter Gaal, San Diego, CA (US); Renqiu Wang, San Diego, CA (US); Xiao Feng Wang, San Diego, CA (US); Hao Xu, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 15/341,753

(22) Filed: Nov. 2, 2016

(65) Prior Publication Data

US 2017/0202028 A1 Jul. 13, 2017

Related U.S. Application Data

(60) Provisional application No. 62/276,211, filed on Jan. 7, 2016.

(51) Int. Cl.
*H04W 74/08* (2009.01)
*H04B 1/7143* (2011.01)
(Continued)

(52) U.S. Cl.
CPC ........ *H04W 74/0833* (2013.01); *H04B 1/713* (2013.01); *H04B 1/7143* (2013.01);
(Continued)

(58) Field of Classification Search
CPC ....... H04W 72/04533; H04W 74/0825; H04W 74/0833; H04W 76/14; H04W 4/06;
(Continued)

(56) References Cited

U.S. PATENT DOCUMENTS 8,175,134 B1 * 5/2012 Giallorenzi ............ H04B 1/692
375/132
8,553,743 B1 10/2013 Nichols et al.
(Continued)

FOREIGN PATENT DOCUMENTS

WO WO-2015191347 A1 12/2015

OTHER PUBLICATIONS

ISA/EP, International Search Report and Written Opinion of the International Searching Authority, Int'l Application No. PCT/US2016/060335, dated May 11, 2017, European Patent Office, Rijswijk, NL, 23 pgs.
(Continued)

*Primary Examiner* — Michael Thier
*Assistant Examiner* — Prince A Mensah
(74) *Attorney, Agent, or Firm* — Nerrie M. Zohn

(57) ABSTRACT

Methods, systems, and devices are described for wireless communication. Dedicated frequency resources of a physical random access channel (PRACH) may be designated for large and small frequency hops to facilitate the determination of timing offsets for PRACH transmissions. For instance, a frequency hopping pattern within the PRACH channel having a plurality of single tone transmission may include a first number of hops associated with a first frequency hopping distance (e.g., large frequency hops), and a second number of hops associated with a second frequency hopping distance (e.g., small frequency hops).

31 Claims, 13 Drawing Sheets

(51) Int. Cl.
*H04B 1/713* (2011.01)
*H04W 72/04* (2009.01)
*H04W 4/70* (2018.01)
*H04W 4/06* (2009.01)

(52) U.S. Cl.
CPC ......... *H04W 4/70* (2018.02); *H04W 72/0453* (2013.01); *H04W 4/06* (2013.01)

(58) Field of Classification Search
CPC .... H04W 4/70; H04W 72/0453; H04B 1/713; H04B 1/715; H04B 1/7136; H04B 1/7143
See application file for complete search history.

(56) References Cited

U.S. PATENT DOCUMENTS

| | | | |
|---|---|---|---|
| 2010/0110994 A1 | 5/2010 | Ratsuk et al. | |
| 2015/0131703 A1* | 5/2015 | Balter | H04B 7/18513 375/133 |
| 2015/0365977 A1* | 12/2015 | Tabet | H04J 13/0062 370/330 |
| 2016/0127936 A1* | 5/2016 | Chatterjee | H04B 7/0626 370/252 |
| 2016/0150504 A1* | 5/2016 | Chae | H04W 76/14 375/133 |
| 2017/0094689 A1* | 3/2017 | Lin | H04W 72/0453 |
| 2018/0295648 A1* | 10/2018 | Chen | H04B 1/713 |
| 2018/0324868 A1 | 11/2018 | Gaal et al. | |

OTHER PUBLICATIONS

ISA/EPO, Partial International Search Report of the International Searching Authority, Int'l App. No. PCT/US2016/060335, dated Feb. 22, 2017, European Patent Office, Rijswijk, NL, 9 pgs.
Qualcomm Incorporated, "Narrow Band of DMA—Random Access," 3GPP TSG GERAN #64, TDOC GP-140840, San Francisco, USA, Nov. 17-21, 2014, 6 pgs., XP050874929, 3rd Generation Partnership Project.
ZTE, "Remaining Issues on Random Access for MTC Coverage Enhancement," 3GPP TSG RAN WG1 Meeting #83, R1-156669, Anaheim, US, Nov. 15-22, 2015, 6 pgs., XP051003068, 3rd Generation Partnership Project.

* cited by examiner

NARROW BAND PHYSICAL RANDOM ACCESS CHANNEL FREQUENCY HOPPING PATTERNS AND DETECTION SCHEMES

CROSS REFERENCES

The present Application for Patent claims priority to U.S. Provisional Patent Application No. 62/276,211 by Gaal et al., entitled "Narrow Band Physical Random Access Channel Frequency Hopping Patterns and Detection Schemes," filed Jan. 7, 2016, and assigned to the assignee hereof, the entirety of which is incorporated by reference herein for any and all purposes.

BACKGROUND

The following relates generally to wireless communication, and more specifically to narrow band physical random access channel hopping patterns and detection schemes.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE). Some communication devices operating on wireless multiple-access communications systems may have limitations on operational frequency bandwidth. These devices may be known as narrow band (NB) devices. In some cases, a wireless communications system may use a combination of the above multiple-access systems to support multiple types of UEs.

NB devices, such as NB Internet of Things (NB-IOT) devices, face numerous challenges. For instance, NB communications may have a limited frequency dimension (e.g., a single resource block (RB)) that is shared by multiple users. Furthermore, timing offsets associated with large coverage areas envisioned for NB-IOT may extend beyond the range for which a cyclic prefix is capable of compensating.

SUMMARY

A physical random access channel (PRACH) may be used for initial system access by narrow band (NB) devices. Some PRACH transmissions may be single tone signals to provide flexibility in NB device support, which may impact determination of timing offsets. Described aspects are directed to frequency hopping patterns for PRACH transmissions by NB devices that include large and small frequency hops to facilitate the determination of timing offsets ("timing advances") from PRACH transmissions. For instance, a PRACH transmission may include frequency hops having a first frequency hopping distance (e.g., large frequency hops) and a second frequency hopping distance (e.g., small frequency hops). Frequency hopping patterns for a random access preamble may then be determined that perform a first number of frequency hops of the first distance and a second number of hops of the second distance. A distribution of large and small hops may be used to provide fine timing resolution and to resolve large propagation delays.

A method of wireless communication is described. The method may include identifying a PRACH for communication between a base station and a UE and determining a frequency hopping pattern within the PRACH for a random access preamble comprising a plurality of single tone transmissions, the frequency hopping pattern comprising a first number of frequency hops associated with a first frequency hopping distance and a second number of frequency hops associated with a second frequency hopping distance.

An apparatus for wireless communication is described. The apparatus may include means for identifying a PRACH for communication between a base station and a UE and means for determining a frequency hopping pattern within the PRACH for a random access preamble comprising a plurality of single tone transmissions, the frequency hopping pattern comprising a first number of frequency hops associated with a first frequency hopping distance and a second number of frequency hops associated with a second frequency hopping distance.

Another apparatus for wireless communication is described. The apparatus may include a processor, memory in electronic communication with the processor, and instructions stored in the memory. The instructions may be operable to cause the processor to identify a PRACH for communication between a base station and a UE and determine a frequency hopping pattern within the PRACH for a random access preamble comprising a plurality of single tone transmissions, the frequency hopping pattern comprising a first number of frequency hops associated with a first frequency hopping distance and a second number of frequency hops associated with a second frequency hopping distance.

A non-transitory computer readable medium for wireless communication is described. The non-transitory computer-readable medium may include instructions operable to cause a processor to identify a PRACH for communication between a base station and a UE and determine a frequency hopping pattern within the PRACH for a random access preamble comprising a plurality of single tone transmissions, the frequency hopping pattern comprising a first number of frequency hops associated with a first frequency hopping distance and a second number of frequency hops associated with a second frequency hopping distance.

Some examples of the method, apparatus, and non-transitory computer-readable medium described above may further include processes, features, means, or instructions for transmitting, by the UE, the random access preamble according to the determined frequency hopping pattern.

In some examples of the method, apparatus, and non-transitory computer-readable medium described above, the first number of frequency hops may be different from the second number of frequency hops.

In some examples of the method, apparatus, and non-transitory computer-readable medium described above, the determined frequency hopping pattern comprises at least one frequency hop determined based at least in part on a pseudo-random function.

In some examples of the method, apparatus, and non-transitory computer-readable medium described above, the random access preamble may be one of a plurality of random access preambles, and wherein different frequency hopping patterns for each of the plurality of random access preambles may be generated using a pseudo-random function.

In some examples of the method, apparatus, and non-transitory computer-readable medium described above, the PRACH comprises a first portion associated with the first frequency hopping distance and a second portion associated with the second frequency hopping distance.

In some examples of the method, apparatus, and non-transitory computer-readable medium described above, the first portion comprises a first set of subcarriers that span a first sub-region of the PRACH and a second set of subcarriers that span a second sub-region of the PRACH, and wherein the first sub-region and the second sub-region may be separated in frequency by a bandwidth of the second portion.

In some examples of the method, apparatus, and non-transitory computer-readable medium described above, the PRACH may be partitioned into a plurality of subcarriers and a plurality of transmission time intervals, and a subcarrier spacing of the plurality of subcarriers may be an integer divisor of a data channel subcarrier spacing for a cell associated with the PRACH.

In some examples of the method, apparatus, and non-transitory computer-readable medium described above, each of the plurality of single tone transmissions spans one of the plurality of transmission time intervals.

Some examples of the method, apparatus, and non-transitory computer-readable medium described above may further include processes, features, means, or instructions for detecting, by a base station, the random access preamble based at least in part on the determined frequency hopping pattern.

A method of wireless communication is described. The method may include identifying a PRACH for communication between a base station and a UE, the PRACH comprising a plurality of subcarriers and determining a frequency hopping pattern within the PRACH for a random access preamble comprising a plurality of single tone transmissions, the frequency hopping pattern comprising a plurality of frequency hops across the plurality of subcarriers, at least one frequency hop of the plurality of frequency hops being associated with a pseudo-random frequency hop distance.

An apparatus for wireless communication is described. The apparatus may include means for identifying a PRACH for communication between a base station and a UE, the PRACH comprising a plurality of subcarriers and means for determining a frequency hopping pattern within the PRACH for a random access preamble comprising a plurality of single tone transmissions, the frequency hopping pattern comprising a plurality of frequency hops across the plurality of subcarriers, at least one frequency hop of the plurality of frequency hops being associated with a pseudo-random frequency hop distance.

Another apparatus for wireless communication is described. The apparatus may include a processor, memory in electronic communication with the processor, and instructions stored in the memory. The instructions may be operable to cause the processor to identify a PRACH for communication between a base station and a UE, the PRACH comprising a plurality of subcarriers and determine a frequency hopping pattern within the PRACH for a random access preamble comprising a plurality of single tone transmissions, the frequency hopping pattern comprising a plurality of frequency hops across the plurality of subcarriers, at least one frequency hop of the plurality of frequency hops being associated with a pseudo-random frequency hop distance.

A non-transitory computer readable medium for wireless communication is described. The non-transitory computer-readable medium may include instructions operable to cause a processor to identify a PRACH for communication between a base station and a UE, the PRACH comprising a plurality of subcarriers and determine a frequency hopping pattern within the PRACH for a random access preamble comprising a plurality of single tone transmissions, the frequency hopping pattern comprising a plurality of frequency hops across the plurality of subcarriers, at least one frequency hop of the plurality of frequency hops being associated with a pseudo-random frequency hop distance.

In some examples of the method, apparatus, and non-transitory computer-readable medium described above, the pseudo-random frequency hop distance may be determined based on at least one of a pseudo-random linear hash function, or a pseudo-random linear cyclic shift.

In some examples of the method, apparatus, and non-transitory computer-readable medium described above, the pseudo-random frequency hop distance may be based on a number of subcarriers of the PRACH.

Some examples of the method, apparatus, and non-transitory computer-readable medium described above may further include processes, features, means, or instructions for detecting, by a base station, the random access preamble based at least in part on the determined frequency hopping pattern.

Some examples of the method, apparatus, and non-transitory computer-readable medium described above may further include processes, features, means, or instructions for determining a timing offset for uplink transmissions from the UE based at least in part on phase information in a plurality of tones of the detected random access preamble.

In some examples of the method, apparatus, and non-transitory computer-readable medium described above, detecting the random access preamble comprises: mapping the phase information for the plurality of tones to a sequence based at least in part on respective transmission time intervals and respective subcarriers of the plurality of single tone transmissions. Some examples of the method, apparatus, and non-transitory computer-readable medium described above may further include processes, features, means, or instructions for performing a frequency transform on the mapped sequence.

In some examples of the method, apparatus, and non-transitory computer-readable medium described above, obtaining the timing offset comprises: identifying a location of a maximum value of an output of the frequency transform of the mapped sequence.

In some examples of the method, apparatus, and non-transitory computer-readable medium described above, detecting the random access preamble comprises: comparing the maximum value with a threshold.

In some examples of the method, apparatus, and non-transitory computer-readable medium described above, detecting the random access preamble comprises: mapping differential phase information between two or more tones of the plurality of tones to a sequence based at least in part on respective transmission time intervals and respective subcarriers of the plurality of single tone transmissions. Some examples of the method, apparatus, and non-transitory computer-readable medium described above may further include processes, features, means, or instructions for performing a frequency transform on the mapped sequence.

Some examples of the method, apparatus, and non-transitory computer-readable medium described above may further include processes, features, means, or instructions for transmitting, by the UE, the random access preamble according to the determined frequency hopping pattern.

Some examples of the methods, apparatuses, or non-transitory computer-readable media described herein may further include processes, features, means, or instructions for narrow band frequency hopping patterns. Further scope of the applicability of the described systems, methods, apparatuses, or computer-readable media will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
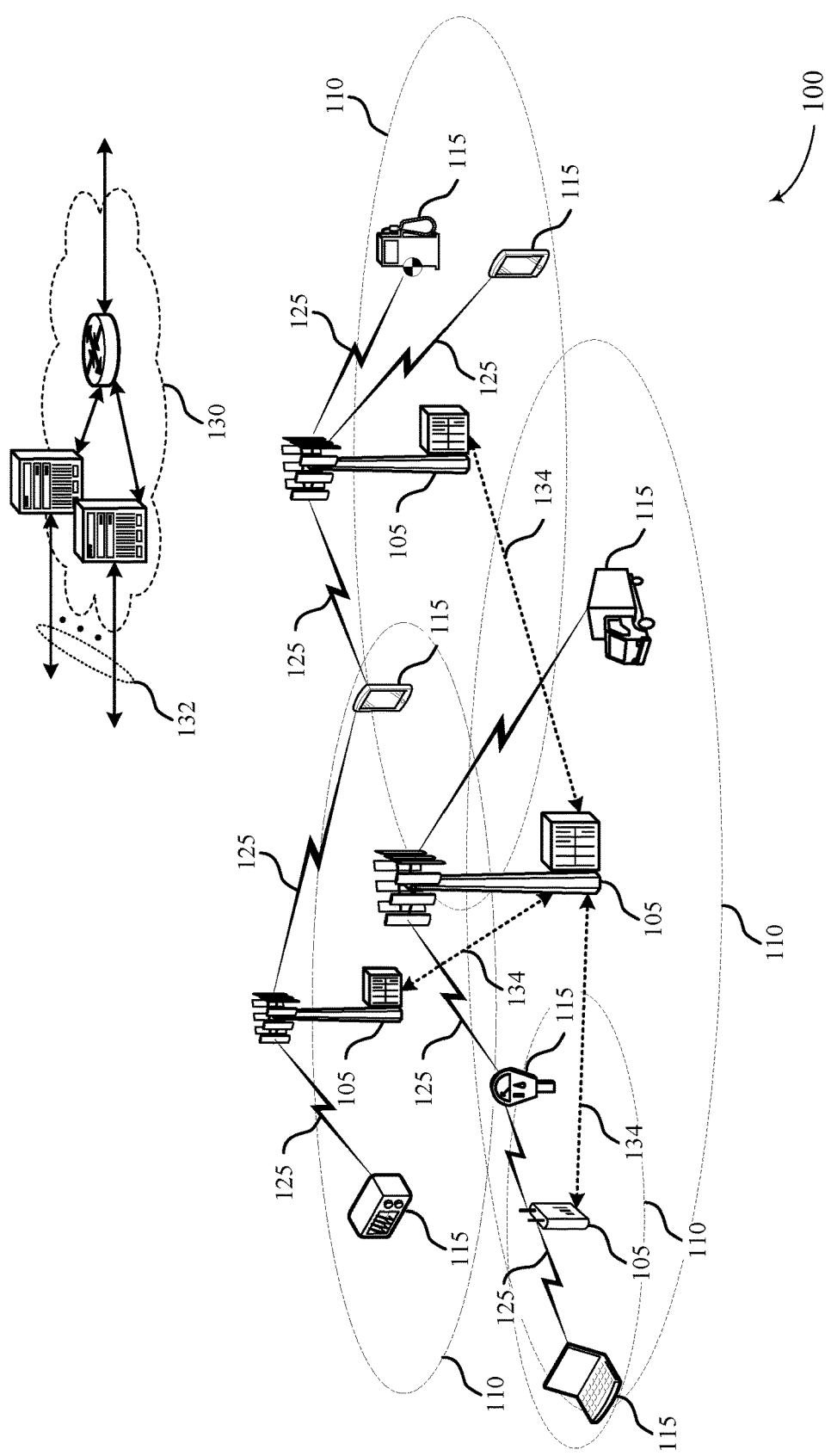
FIG. 1 illustrates an example of a wireless communications system that supports narrow band (NB) physical random access channel (PRACH) frequency hopping patterns and detection schemes in accordance with various aspects of the present disclosure.

According to the present disclosure, narrow band (NB) devices using frequency resources of a physical random access channel (PRACH) for system access may employ large and small frequency hops to facilitate the determination of timing offsets ("timing advances") for the NB devices. Aspects of the disclosure are described in the context of a wireless communication system. For example, a wireless communication system may support Long Term Evolution (LTE) or LTE-Advanced (LTE-A) communications in addition to NB communications concurrently (e.g., on the same or separate wireless channels). Devices may perform system access using resources configured as a NB PRACH. For example, an NB device may transmit an NB preamble sequence over NB PRACH resources without pre-scheduling from a base station. An NB preamble sequence may utilize a number of single-tone transmissions that frequency hop each transmission interval. A base station may use the received NB preamble sequence to determine a timing offset for subsequent (e.g., scheduled) transmissions from an NB device. In some cases, a distribution of large and small hops may be used to provide fine timing resolution and to resolve large propagation delays.

In one example, an NB PRACH may include a first portion of NB PRACH resources that are used for large frequency hops and a second portion of NB PRACH resources that are used for small frequency hops. Frequency hopping patterns may then be determined for this NB PRACH that include a number of large frequency hops, small frequency hops, random frequency hops, or a combination thereof. These frequency hopping patterns may be used to determine random access preambles for transmission over the NB PRACH. For instance, a user equipment (UE) may randomly select and transmit a random access preamble over the NB PRACH based on a frequency hopping pattern. The random access preamble may include a series of transmissions that each span a transmission interval and that may hop to a different frequency at the end of each transmission interval. A base station may detect a transmitted random access preamble based on the frequency hopping pattern used by the UE. After detecting the random access preamble, the base station may use information of the random access preamble (e.g., the different subcarrier frequencies transmitted across the preamble) to determine timing offsets for the UE that transmitted the random access preamble.

Different frequency hopping patterns may be used to generate non-overlapping random access preambles. For instance, a linear hash function, a cyclic shift, or both may be used to generate sequences used as random access preambles. In some cases, the frequency hopping patterns may transition between large and small frequency hops after N transmission intervals. Frequency hopping patterns for different devices may differ based on application of a pseudo-random function within the frequency hopping patterns, which may be determined based on a linear hash function, a cyclic shift, or a combination thereof. These and other aspects of the disclosure are further illustrated by and described with reference to apparatus diagrams, system diagrams, and flowcharts.

FIG. 1 illustrates an example of a wireless communications system 100 that supports NB frequency hopping patterns in accordance with various aspects of the present disclosure. The wireless communications system 100 includes base stations 105, UEs 115, and a core network 130. In some examples, the wireless communications system 100 may be an LTE/LTE-A network.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device, an Internet of Things (IoT) device, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

Some types of wireless devices may provide for automated communication. Automated wireless devices may include those implementing Machine-to-Machine (M2M) communication or MTC. M2M or MTC may refer to data communication technologies that allow devices (e.g., IoT devices, etc.) to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications. MTC devices may be capable of single-tone communications, multi-tone communications, or both. A device that is capable only of single-tone communication may transmit using a single tone (subcarrier) per transmission time interval (TTI). A multi-tone device may use multiple tones per TTI.

LTE systems may utilize orthogonal frequency division multiple access (OFDMA) on the DL and single carrier frequency division multiple access (SC-FDMA) on the UL. OFDMA and SC-FDMA partition the system bandwidth into multiple (K) orthogonal subcarriers, which are also commonly referred to as tones or bins. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guard band) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8, or 16 sub-bands. Some MTC UEs 115 may operate in a narrower bandwidth compared to the full system bandwidth.

The system resources may also be partitioned in time into different periods of times (e.g., frames, subframes, slots, symbol periods, etc.). In some examples, an LTE frame structure may define a frame to include 10 subframes, a subframe to include two slots, and a slot to include 6 to 7 symbol periods depending on a length of a cyclic prefix included in the symbol period. In some examples, a frame may span 10 ms, a subframe may span 1 ms, a slot may span 0.5 ms, and a symbol period may span ~72 or 83 µs. In some cases, the subcarrier spacing may be based on the length of the symbol period (e.g., the inverse of the symbol period). The wireless communications system 100 may designate a resource block (RB) as the smallest number of resources that may be allocated to a UE 115. The wireless communications system 100 may schedule communications to a UE using RBs, which may be defined to span 12 subcarriers and one slot, or 72 or 84 resources. In some cases, a UE 115 may perform transmissions that extend through a minimum duration, or TTI. In some cases, a TTI may span a single slot or subframe. In other cases, a TTI may span one or two symbol periods.

The wireless communications system 100 may use carriers, which may be referred to as component carriers (CCs), of different bandwidths (e.g., 1.4, 3, 5, 10, 15, or 20 MHz) that use the partitioned resources to transmit packets between a base station 105 and a UE 115. The wireless communications system 100 may use the carriers along with frequency division duplex (FDD) (e.g., using paired spectrum resources) or time division duplex (TDD) operation (e.g., using unpaired spectrum resources) to perform bidirectional communications. Frame structures for FDD (e.g., frame structure type 1) and TDD (e.g., frame structure type 2) may be defined. For TDD frame structures, each subframe may carry UL or DL traffic, and special subframes may be used to switch between DL and UL communication. Allocation of UL and DL subframes within radio frames may be symmetric or asymmetric and may be statically determined or may be reconfigured semi-statically. Special subframes may carry DL or UL traffic and may include a Guard Period (GP) between DL and UL traffic. Switching from UL to DL traffic may be achieved by setting a timing offset at the UE 115 without the use of special subframes or a GP.

In some cases, multiple CCs may be aggregated or utilized concurrently to provide some UEs 115 with greater bandwidth and, e.g., higher data rates. Thus, individual CCs may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode. A CC used for DL may be referred to as a DL CC, and a CC used for UL may be referred to as an UL CC. A UE 115 may be configured with multiple DL CCs and one or more UL CCs for carrier aggregation. Each carrier may be used to transmit control information (e.g., reference signals, control channels, etc.), overhead information, data, etc. A UE 115 may communicate with a single base station 105 utilizing multiple CCs, and may also communicate with multiple base stations simultaneously on different CCs. In some examples, a UE 115 may receive information from CCs associated with different radio access technologies. For instance, a UE 115 may receive information on an LTE CCs and an unlicensed CC or an NB CC.

Wireless communications system 100 may use multiple channels, such as logical channels, transport channels, and physical layer channels, to communicate data. Channels may also be classified into Control Channels and Traffic Channels. Logical control channels may include paging control channel (PCCH) for paging information, broadcast control channel (BCCH) for broadcast system control information, multicast control channel (MCCH) for transmitting multimedia broadcast multicast service (MBMS) scheduling and control information, dedicated control channel (DCCH) for transmitting dedicated control information, common control channel (CCCH) for random access information, DTCH for dedicated UE data, and multicast traffic channel (MTCH), for multicast data. DL transport channels may include broadcast channel (BCH) for broadcast information, a DL shared channel (DL-SCH) for data transfer, paging channel (PCH) for paging information, and multicast channel (MCH) for multicast transmissions.

UL transport channels may include random access channel (RACH) for access and UL shared channel (UL-SCH) for data. DL physical channels may include a physical broadcast channel (PBCH) for broadcast information, physical control format indicator channel (PCFICH) for control format information, physical DL control channel (PDCCH) for control and scheduling information, physical HARQ indicator channel (PHICH) for hybrid automatic repeat request (HARQ) status messages, physical DL shared channel (PDSCH) for user data and physical multicast channel (PMCH) for multicast data. UL physical channels may include physical random access channel (PRACH) for access messages, physical UL control channel (PUCCH) for control data, and physical UL shared channel (PUSCH) for user data. In some cases, data associated with each channel may be mapped to the carrier structure for transmission across an air interface.

The PRACH may be allocated time and frequency resources during which UEs 115 may initiate communication with the wireless communications system 100 without prior scheduling. In some examples, the PRACH may have a bandwidth of six RBs and may span one to two subframes. The base station 105 may advertise the RBs reserved for the PRACH in a system information block (SIB), and a UE 115 may transmit a cyclic prefix, a preamble sequence, and a GP during the advertised PRACH resource. Since there is no prior scheduling or coordination, a UE 115 may select (e.g., randomly) the preamble sequence from a number of available preambles. The preamble may contain one or two PRACH symbols that span 133, 800, or 1600 µs in length. The preamble sequence may be mapped to subcarriers and symbol periods and transmitted across a bandwidth of approximately 1.05 MHz (e.g., 839 subcarriers at 1.25 kHz subcarrier spacing or 139 subcarriers at 7.5 kHz subcarrier spacing, etc.). Since there is no pre-coordination, a UE 115 may transmit the preamble without a timing offset (e.g., based on timing determined from synchronization signals transmitted by the base station 105). The base station 105 may use the received preamble sequence to distinguish multiple UEs 115 that are each transmitting over the PRACH resources from one another and to determine respective timing offsets for each UE 115.

Timing offsets may be used to adjust a time when UEs 115 scattered across a coverage area 110 begin UL transmissions so that the UL transmissions are aligned when they reach a corresponding base station 105. For instance, a UE 115 that is a larger distance away from a base station 105 may begin transmitting earlier than another UE 115 that is a shorter distance away from the base station 105 to compensate for a longer propagation delay. In some cases, a cyclic prefix may be included in transmitted symbols to further resolve variations in the alignment of the transmissions received at the base station 105.

In some cases, a wireless communications system 100 may utilize both LTE and NB radio access technologies. In some examples, NB communications may be used to serve MTC devices. NB communications may use limited frequency resources, and, in some cases, may be limited to a single RB of system bandwidth (e.g., 180 KHz), a series of RBs, or portions of an RB. In some examples, the frequency resources set aside for NB communications may be located within an LTE carrier, in a guard band of an LTE carrier, or separate from an LTE carrier in a "standalone" deployment. In some cases, the NB resources may be simultaneously utilized by multiple UEs 115. The NB resources may be used to provide deep coverage to support devices in environments that are associated with different coverage enhancement (CE) levels. For instance, certain stationary devices may be located in environments with poor coverage, such as a basement. Additionally, the NB resources may be associated with communications within a large coverage area 110 (e.g., greater than 35 kilometers (km)). Communications to a device at an edge of the coverage area 110 may have a large delay (e.g., 200 µs) in comparison to an LTE symbol time (e.g., 72 µs).

In some cases, wireless communications system 100 may utilize coverage enhancement (CE) techniques with either LTE or NB communications to improve the quality of a communication link 125 for UEs 115 located at a cell edge, operating with low power transceivers, or experiencing high interference or path loss. CE techniques may include repeated transmissions, TTI bundling, HARQ retransmission, PUSCH hopping, beamforming, power boosting, repetitive transmissions, or other techniques. The CE techniques used may depend on the specific needs of UEs 115 in different circumstances, and may be effective for reaching devices that are located in areas that routinely experience poor channel conditions. Different CE levels may be associated with different levels of coverage levels enhancements, and may be assigned to UEs 115 based on a signal strength detected at a UE 115. For instance, a device that is near an edge of a coverage area 110 may be associated with a high CE level (e.g., an enhancement of 20 decibels (dBs)), while a device that is near a serving base station 105 may be associated with a low CE level (e.g., no enhancement).

Certain frequency resources may be allocated to an NB PRACH to enable access by NB devices (e.g., MTC devices, NB-UEs, NB-MTC devices, etc.). In some cases, the NB PRACH may be allocated one RB (e.g., a 180 KHz bandwidth), a series of RBs, or a portion of an RB. An NB-UE 115 may transmit a preamble sequence as a series of tones across the PRACH resources to initiate communication with a base station 105 and allow the base station 105 to determine a timing offset. The NB PRACH may be designed to support both single tone and multi-tone devices, and may therefore be designed using a single tone transmission scheme. In some examples, a preamble sequence may hop across multiple tones at intervals that are greater than the duration associated with the round-trip delay at the edge of a coverage area 110. That is, a preamble sequence may transmit an NB signal at the carrier frequency associated with a single subcarrier for a transmission interval and may then frequency hop to a second subcarrier to perform another transmission at the carrier frequency of the second subcarrier for another transmission interval. In some cases, the transmission intervals may be 1 ms in length and the NB signal may include un-modulated tones (e.g., no modulated preamble sequence). Furthermore, as the preamble sequence may use 1 ms transmission time intervals, the subcarrier spacing may be determined to be the inverse of the transmission time intervals, or 1 KHz. Accordingly, for a resource block with a 180 KHz bandwidth, there may be 180 PRACH tones, 20 of which may be designated as guard tones. The remaining 160 tones may be used to support 160 orthogonal PRACH resources. Alternatively, the PRACH may use different subcarrier spacing (e.g., 1.25 KHz, 7.5 KHz, 15 KHz, etc.) and corresponding time intervals for each tone of the preamble.

As discussed above, an NB-UE 115 attempting to access the NB resources using the NB PRACH may not use a timing offset for a PRACH preamble transmission and, in some cases, it may be helpful for the base station 105 to use the received preamble sequence to determine the timing offset for subsequent transmissions. In some examples, the base station 105 may use the difference in the phase of two or more tones received at different frequencies to determine the timing offset. The timing accuracy for determining the timing offset based on two tones on different subcarriers may be dependent on the frequency difference between the tones. However, tones having large frequency separation may not be able to resolve ambiguity between delays having a multiple of the phase of the higher tone. Thus, large hops may not be effective for determining the timing offset for NB-UEs 115 that are distant from the base station 105, because they experience a larger delay. Therefore, a combination of large and small frequency hops transmitted by a NB-UE 115 may be beneficial to determining the timing offset.

In some cases, dedicated frequency resources of the NB PRACH may be designated to large and small frequency hops. For instance, a first portion of an NB PRACH channel may be associated with a first frequency hopping distance (e.g., large frequency hops), and a second portion of the NB PRACH may be associated with a second frequency hopping distance (e.g., small frequency hops). Frequency hopping patterns for a random access preamble may then be determined that perform a first number of frequency hops of the first distance and a second number of hops of a second distance. The first number of frequency hops may be within the first portion of the NB PRACH and the second number of frequency hops may be within the second portion of the NB PRACH. In this way, preamble sequences that include a number of large or small frequency hops may be determined. In some cases, the NB PRACH may be further partitioned into portions associated with different (e.g., larger, medium, and smaller) frequency hop sizes.

Figure 2:
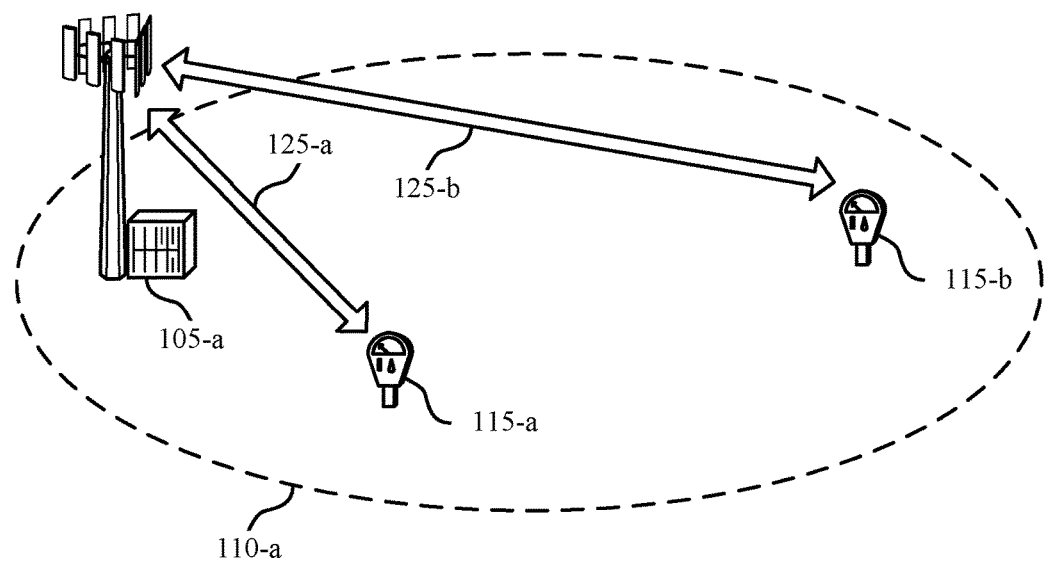
FIG. 2 illustrates an example of a wireless communications subsystem that supports NB PRACH frequency hopping patterns and detection schemes in accordance with various aspects of the present disclosure.

FIG. 2 illustrates an example of a wireless communications subsystem 200 that supports NB frequency hopping patterns in accordance with various aspects of the present disclosure. Wireless communications subsystem 200 may include UE 115-a, UE 115-b, base station 105-a, communication link 125-a, and communication link 125-b which may be examples of a UE 115, a base station 105, or a communication link 125 and may communicate with one another over a communication link 125 as described above with reference to FIG. 1. In some examples, UE 115-a and UE 115-b may be NB-UEs as described above with reference to FIG. 1.

In the example of FIG. 2, communication between UEs 115-a, UE 115-b, and base station 105-a may utilize an NB frequency hopping pattern for a random access preamble that includes small and large frequency hops across an NB PRACH. The NB PRACH may be allocated one or multiple contiguous RBs that span across multiple subframes or frames. In some examples, the NB PRACH may be allocated a single RB (e.g., 180 KHz) in consecutive subframes. Furthermore, in some examples, a preamble tone interval for a preamble sequence using the NB PRACH may be 1 ms in length, and the NB PRACH may use 1 KHz subcarrier spacing. A guard portion—e.g., 10 subcarriers at each end of the PRACH resources—of the NB PRACH may be left unused, a large frequency hop portion—e.g., 40 subcarriers at each end of the PRACH resources minus the guard portion—of the NB PRACH may be allocated for large frequency hops, and a small frequency hop portion—e.g., 80 subcarriers between subcarriers allocated to the large frequency hop portion—of the NB PRACH may be allocated for small frequency hops. Preamble sequences may then be generated according to frequency hopping patterns that include large frequency hops using the large frequency hop portion and small frequency hops using the small frequency hop portion, as will be discussed in more detail below and with reference to FIGS. 3 and 4.

Base station 105-a may broadcast the time and frequency location of the NB PRACH resources over coverage area 110-a. UE 115-a and UE 115-b may select a preamble sequence of the generated preamble sequences for transmission to base station 105-a. When initiating a connection to base station 105-a, UE 115-a and UE 115-b may transmit their selected preamble sequences over the PRACH resources. The preamble sequences may include an ordered set of indices that correspond to a frequency resource in either the large frequency hop portion or the small frequency hop portion. Transmitting the preamble sequences may include transmitting a first signal at a first subcarrier frequency for a first preamble tone interval, a second signal at a subcarrier frequency for a following preamble tone interval, and so on, as will be discussed in more detail below and with reference to FIGS. 3 and 4. However, as discussed above, neither UE 115-a nor UE 115-b may compensate for propagation delay of the received broadcast signal or the transmitted preamble sequence prior to transmitting the preamble sequence. Accordingly, the preamble sequence transmitted from UE 115-a may reach base station 105-a before the preamble sequence transmitted from UE 115-b.

Base station 105-a may perform preamble sequence detection by observing whether the preamble sequence transmitted from UE 115-a or UE 115-b has been received according to the corresponding frequency hopping pattern, as will be discussed in more detail below and with reference to FIGS. 3 and 4. After detecting that a preamble sequence for UE 115-a or UE 115-b has been received, base station 105-a may use the frequencies of the received signals to determine a timing offset for subsequent transmissions from the corresponding UE 115. Base station 105-a may then transmit an indication of the timing offset to either UE 115-a or UE 115-b depending on which preamble sequences were successfully received.

Figure 3:
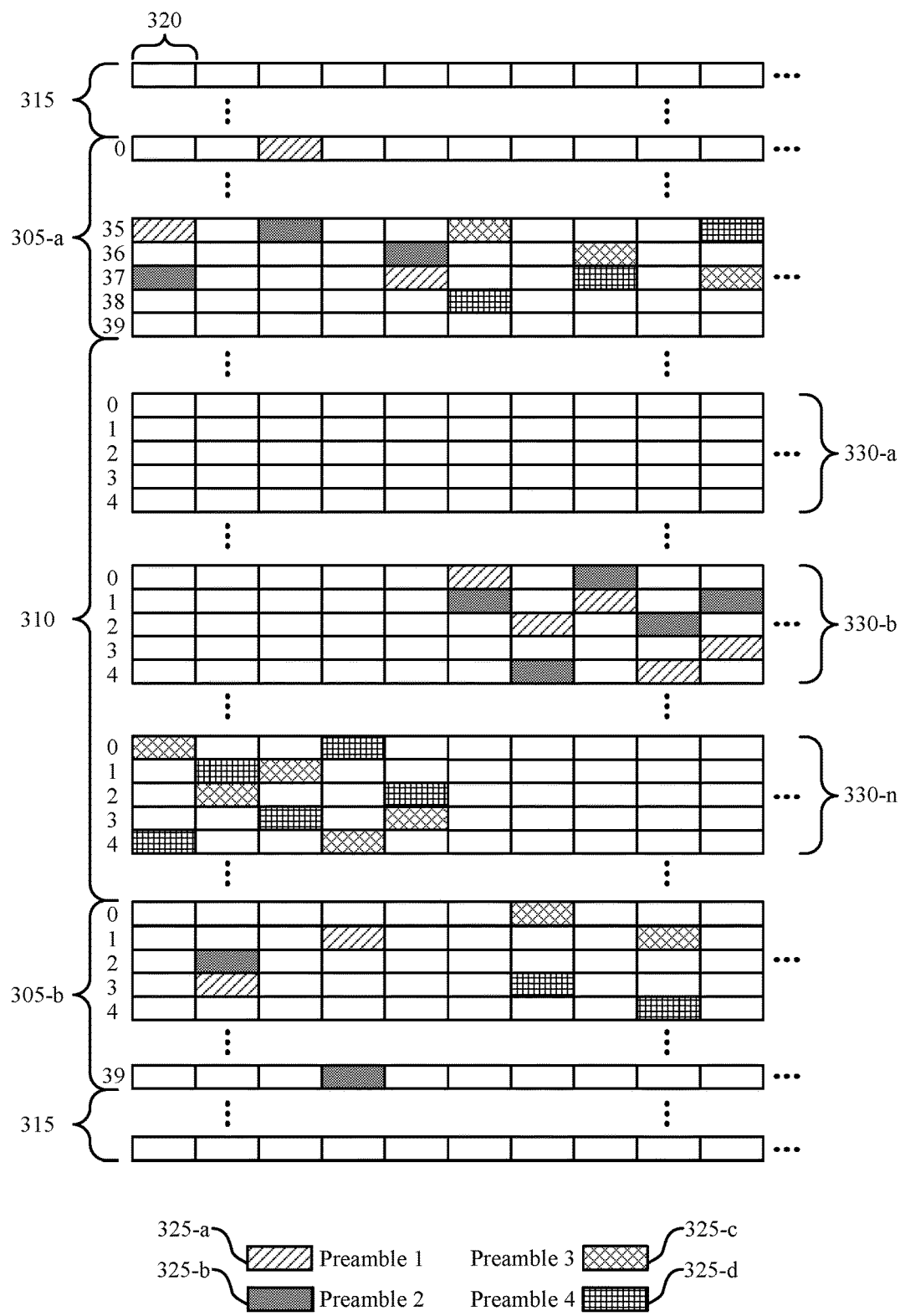
FIG. 3 illustrates an example of an NB PRACH that supports NB frequency hopping patterns and detection schemes in accordance with various aspects of the present disclosure.

FIG. 3 illustrates an example of an NB PRACH 300 that supports NB frequency hopping patterns in accordance with various aspects of the present disclosure. NB PRACH 300 may illustrate aspects of a transmission between a UE 115 and a base station 105, as described above with reference to FIGS. 1 and 2. NB PRACH 300 may include a large hop region 305 which may be partitioned into a large hop sub-region 305-a and a large hop sub-region 305-b, a small hop region 310, guard bands 315, preamble tone intervals 320, a first preamble 325-a, a second preamble 325-b, a third preamble 325-c, and a fourth preamble 325-d.

In the example of FIG. 3, the NB PRACH 300 includes up to 180 subcarriers. The first large-hop sub-region 305-a and the second large hop sub-region 305-b may be associated with large frequency hopping distances and the small hop region 310 may be associated with small frequency hopping distances. The first and second large hop sub-regions 305-*a* and 305-*b* may each include 40 subcarriers, and the small hop region 310 may include 80 subcarriers. The small hop region 310 may further be partitioned into subcarrier groups 330-*a* to 330-*n*. Each subcarrier group may include a number of subcarriers that is an integer divisor of the total number of subcarrier included in the small hop region 310, for instance, the small hop region 310 may be partitioned into 16 subcarrier groups of five subcarriers. The guard bands 315 may each include 10 subcarriers. In some cases, a preamble tone interval 320 may span an LTE subframe (e.g., 1 ms), and NB PRACH 300 may span multiple contiguous preamble tone intervals (e.g., 30 ms or three LTE frames). In other cases, NB PRACH 300 may span multiple dis-contiguous preamble tone intervals 320 (e.g., may span three discontiguous sets of ten preamble tone intervals). Furthermore, although NB PRACH 300 is depicted as a contiguous set of frequency resources, in some cases, NB PRACH 300 may include dis-contiguous resources. For instance, the small hop region 310 may be located above large hop sub-region 305-*a*, while large hop sub-region 305-*b* may still be located a second portion below from large hop sub-region 305-*a*. In some examples, additional regions may be designated for frequency hops of different sizes (e.g., larger, medium, smaller, etc.). Additional hops may be used to determine intermediate time offset values.

With 20 subcarriers allocated to guard bands 315, up to 160 non-colliding frequency hopping patterns may be determined to generate 160 preamble sequences. In the example of FIG. 3, four preambles 325-*a* to 325-*d* are depicted. The first and second preambles 325-*a* and 325-*b* may hop in frequency each preamble tone interval 320 according to a frequency hopping pattern. In some examples, the frequency hopping pattern for the first and second preambles 325-*a* and 325-*b* may be realized as a sequence of numbers that correspond to the subcarriers in a subcarrier group 330 or in a large hop sub-region 305. The first and second preamble sequences 325-*a* and 325-*b* may additionally alternate between performing N frequency hops at a first distance and then N frequency hops at a second distance. In some cases, the value of N is based on the number of subcarriers in a subcarrier group 330. The first preamble 325-*a* and the second preamble 325-*b* may begin in the large hop sub-group 305-*a*.

After each preamble tone interval 320, the large frequency hopping pattern may include frequency hops between any subcarrier in the large hop sub-region 305-*a* and any subcarrier in the large hop sub-region 305-*b*. A preamble sequence may include random subcarriers selected within each of large hop sub-regions 305-*a* and 305-*b*. For instance, as depicted in FIG. 3, the first preamble 325-*a* may have the preamble sequence {35, 3, 0, 1, 37}, and the second preamble 325-*b* may have the sequence {37, 2, 35, 39, 36}. In some examples, the subcarriers allocated to the large hop sub-regions may be further broken down in to groups G, where G may be in the range [1, . . . , 39]. The preamble sequences 325-*a* and 325-*b* may be determined using a random linear hash function, a random linear cyclic shift, or both. The random linear hash function may be used to randomize NB PRACH resources in adjacent tones, and the random cyclic shift within a subcarrier group may be used to randomize interference with neighboring cells.

In some examples, the random linear hash function may be implemented by selecting a prime number p that is greater than the number of tones M in the large hop sub-regions 305. The resources t in the large hop sub-regions 305 may be numbered as t=0, 1, . . . , M−1, and a random number, $r_1$, may be drawn from the range [0, 1, . . . , p−2]. A hashed ordering H(k) may then be created for k=0, 2, . . . , p−2, where:

$$H(k)=(((r_1+1)*(k+1))\bmod p)-1. \quad (1)$$

Any number for which H(k)>M−1 may be removed to create a shortened sequence H'(k). The resources t may then be mapped to H'(t). The number $r_1$ may be generated by taking L consecutive bits of the scrambling shift register sequence, forming an integer Z between 0 and $2^L-1$, and then taking $r_1$=Z mod(p−1). In some cases, the scrambling sequence can be initialized with a value that is a function of the physical cell identity (PCID). To generate a random cyclic shift, a random number $r_2$ may be generated similarly to $r_1$, but may take a different L consecutive bits. And a shifted tone location may be determined by mapping t to (H'(t)+$r_2$+1) mod M.

After N frequency hops in the large hop sub-regions 305, the first and second preambles 325-*a* and 325-*b* may transition to the small hop region 310 and may further be located in subcarrier group 330-*b*. The first and second preambles 325-*a* and 325-*b* may perform N frequency hops in the subcarrier group 330-*b*. The small hop pattern may be determined by first selecting a resource index within the 80 tones from the range [0, 1, . . . , 79], and then determining a subgroup index by using the equation: floor (resource index/G), where G may be in the range [1, . . . , 79]. In one example, G=5, which yields the subgroup index [0, 1, . . . , 15]. The hopping pattern may then be determined within the subcarrier group 330 associated with the subgroup index. For instance, as depicted in FIG. 3, the first preamble 325-*a* may have the preamble sequence {0, 2, 1, 4, 3}, and the second preamble 325-*b* may have the sequence {4, 1, 3, 0, 2}. In other examples, the preamble sequences 325-*a* and 325-*b* may be determined using a random linear hash function, a random linear cyclic shift within the number of subcarrier assigned to a subcarrier group 330, or both.

In some examples, the linear hash may be accomplished by alternating within a frequency hopping cycle between two sequences—e.g., an even numbered sequence: {0, 1, 2, 3, 4} and an odd number sequence: {0, 2, 4, 1, 3}. This may also be achieved by multiplying the index by 2 and taking modulo 5. Additionally or alternatively, the linear hash may be accomplished by cycling through the following sequences: Sequence number 0 mod 4: {0, 1, 2, 3, 4}; Sequence number 1 mod 4: {0, 2, 4, 1, 3}; Sequence number 2 mod 4: {0, 4, 3, 2, 1}; Sequence number 3 mod 4: {0, 3, 1, 4, 2}. In some cases, the random cyclic shift may be accomplished by generating a random number $r_q$, where q is the subgroup index (q=0, 1, . . . , 15) similar to how $r_1$ was generated but with a different L consecutive bits. The shifted tone location may be calculated by adding $r_q$ to the tone index within the subgroup and taking mod 5. The third and fourth preambles 325-*c* and 325-*d* may use similar frequency hopping patterns but may begin in the small hop region 310 and then transition to the large hop sub-regions 305.

A UE may transmit one of preambles 325-*a* through 325-*d* according to the determined frequency hopping pattern. A base station may detect the transmitted preambles 325 by observing the PRACH resources according to the corresponding frequency hopping patterns. For instance, for the first preamble 325-*a*, at each subsequent preamble tone interval 320 the base station may sequentially observe each of the frequency locations {35, 0, 36, 1, 37}. That is, the base station may observe the 35th subcarrier of large hop sub-region 305-*a* at the first preamble tone interval 320; the 0th subcarrier of large hop sub-region 305-*b* of large hop sub-region 305-*b*; etc. Based on observing these time and frequency resources, the base station may determine whether preamble 325-*a* is present, a time offset value, and a frequency offset value. In one example, preamble 325-*a* includes W tones in W preamble tone intervals 320. The tone index in a kth subframe may be F(k), where k=0, 1, . . . , W−1. and where F(k) is in the range [0, 1, . . . , M−1] with M=160. For each preamble tone interval 320, k, the observed signal in tone F(k) is Y(k). In some examples, Y(k) is an output of a fast Fourier transform (FFT) based on the signal received over the preamble tone interval 320 filtered to 180 KHz.

A sequence s(j) may be formed where j=0, 1, . . . , M−1. If j=F(k) for some k then s(j)=Y(k)*exp(−2*π*i*f*k*T), where T is the duration of preamble tone interval 320, and where i is the imaginary component. And if j≠F(k) for any k then s(j)=0. If j=F(k) for more than one k then s(j)=mean (Y(k)*exp(−2*π*i*f*k*T)) for the k values for which j=F (k). The base station may take an FFT, inverse FFT (IFFT), discrete Fourier transform (DFT), or inverse DFT (IDFT) of s(j), where s(j) may be of M elements, or zero padded to more than M elements to perform time interpolation. Alternatively, the sequence s(j) can be formed in terms of differentials. For example, the sequence s(j) may be formed as follows: if j=F($k_2$)−F($k_1$) for a pair $k_1$ and $k_2$ then s(j)=Y($k_2$)*conj(Y($k_1$))*exp(−2*π*i*f*($k_2$−$k_1$)*T) and s(j)=0 otherwise. In some examples, the choice of $k_1$ and $k_2$ may be limited to pairs that are close in time (e.g., abs($k_2$−$k_1$)<e). If the limit e is chosen to be appropriately small then the term exp(−2*π*i*f*($k_2$−$k_1$)*T) may be small and may be ignored. A particular example is taking differentials of consecutive pairs—e.g., if j=F(k+1)−F(k) for some k then s(j)=Y(k+1)*conj(Y(k)). In another example, higher order differentials may also be formed, e.g., if j=(F($k_4$)−F($k_3$))−(F($k_2$)−F($k_1$)) for a set of $k_1$, $k_2$, $k_3$ and $k_4$ then s(j)=(Y($k_4$)*conj(Y($k_3$)))*(conj(Y($k_2$)*conj(Y($k_1$)))), etc.

The base station may determine a maximum value and maximum location of the FFT output, and may compare the absolute value of the maximum value with a threshold to determine the presence of a preamble 325. In some cases, the threshold may be a scaled version of the average of the FFT output value with or without the maximum value. The identified maximum location may be used to determine a time offset based on a received preamble 325. The base station may further scale the determined time offset value based on subcarrier spacing, zero padding of the FFT, etc. In some cases, the time offset may be one-sided (e.g., include only positive or negative values) or may be two-sided (e.g., included positive and negative values).

In some examples, the NB PRACH 300 may be considered as one large portion and a fully randomized hopping pattern may be used. For instance, a frequency hopping pattern may be determined for a random access preamble that includes multiple frequency hops of pseudo-random distances. In the case of a single portion, the linear hash or cyclic shift hopping patterns used for the large hop pattern may similarly be used but with, for example, M=160 and p=163. Alternatively, predefined hopping patterns may be used. For example, a hopping pattern may be defined that includes hops of several different distances, or a complete (or almost complete) set of hopping distances with fewer hops than orthogonal resources (e.g., having hops defined by a sparse ruler or Golomb ruler of order W and distance M, etc.). Information obtained from differentials may be weighted by the time between the differentials to reduce the effect of frequency error.

Figure 4:
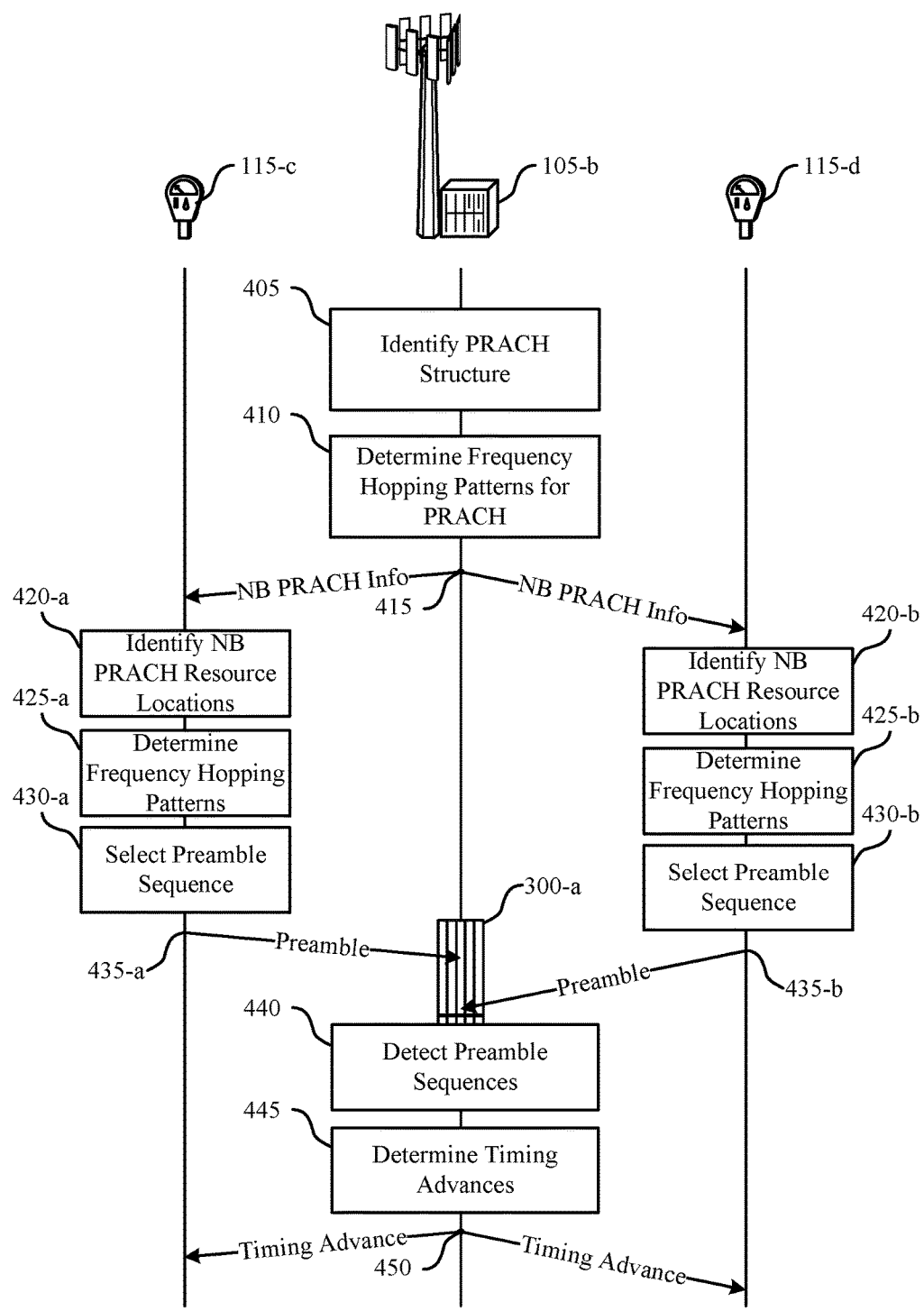
FIG. 4 illustrates an example of a process flow that supports NB PRACH frequency hopping patterns and detection schemes in accordance with various aspects of the present disclosure.

FIG. 4 illustrates an example of a process flow 400 for NB frequency hopping patterns in accordance with various aspects of the present disclosure. Process flow 400 may be performed by UE 115-*b*, UE 115-*c*, and base station 105-*b*, which may be an example of a UE 115 and base station 105 described above with reference to FIGS. 1 and 2. In some examples, UE 115-*c* and UE 115-*d* may be NB devices and may transmit random access preambles to base station 105-*b* based on received NB PRACH information. Base station 105-*b* may detect the transmitted random access preamble sequences and may use the received random access preamble sequences to determine timing offsets for UE 115-*c* and UE 115-*d* for subsequent transmissions.

At 405, base station 105-*b* may identify the structure of a PRACH. For instance, base station 105-*b* may identify that the PRACH includes a first portion of PRACH resources that are associated with a first frequency hopping distance (e.g., a large frequency hopping distance) and a second portion of PRACH resources that are associated with a second frequency hopping distance (e.g., a small frequency hopping distance). The first and second portions of the PRACH may be further partitioned into a number of subcarriers and preamble tone intervals. The subcarrier spacing may be an integer divisor of a data channel subcarrier spacing (e.g., 15 KHz) and may be based on the length of the preamble tone intervals. In some cases, the length of a preamble tone interval is 1 ms and the subcarrier spacing is 1 KHz. In some cases, the first portion includes a first sub-region and a second sub-region that each includes a number of subcarriers and may be separated by the bandwidth of the second portion, as described with reference to FIG. 3. In some cases, the subcarriers of the second portion may be grouped into groups of N subcarriers, as described with reference to FIG. 3. In some cases, base station 105-*b* may designate which portions of the PRACH will be associated with which frequency hopping distances. In other cases, the wireless communication system may indicate to base station 105-*b* how the PRACH is partitioned.

At 410, base station 105-*b* may determine frequency hopping patterns for one or more random access preamble sequences based on the identified PRACH structure. For instance, the base station may determine frequency hopping patterns that include a number of frequency hops that use the first portion of PRACH resources and the first frequency hopping distance, and a number of frequency hops that use the second portion of the PRACH resources and the second frequency hopping distance. In some cases, the number of hops may be based on environmental (e.g., location) or current channel conditions (e.g., received signal strength, signal-to-noise ratio, etc.). In one example, the number of frequency hops of the first distance and the second distance may be equal or substantially equal. For example, the number of frequency hops of the first distance may make up 40-60% of the frequency hops and the number of frequency hops of the second distance may make up the remaining percentage. In some examples, the frequency hopping patterns are determined based on a pseudo-random linear hash function, a pseudo-random linear cyclic shift, or both, as described above with reference to FIG. 3. For example, the frequency hopping patterns for one or both of the first portion and the second portion of PRACH resources may be based on a pseudo-random function.

At 415, base station 105 may broadcast NB PRACH information over the cell's coverage area. The NB PRACH information may include information such as a cell ID, frequency hopping pattern types, the PRACH structure, seed index, etc. UE 115-*c* and UE 115-*d* may both received the transmitted NB PRACH information. In some cases, UE 115-d may receive the information at a later point in time than UE 115-c. For instance, UE 115-d may be located further from base station 105-b than UE 115-c and may receive the signal later due to propagation delay. In some cases, UE 115-c and UE 115-d may determine the NB PRACH information independently of base station 105-b— e.g., from a neighboring base station, hard-coding, etc.

At 420, UE 115-c and UE 115-d may identify the location of NB PRACH resources based on the received NB PRACH information. In some cases, UE 115-c and UE 115-d may determine a duration from receiving the PRACH information to when the NB PRACH will be allocated resources. For instance, UE 115-c and UE 115-d may determine a wireless communications system timing based on a received synchronization signal, however, UE 115-c and UE 115-d may be unaware of the propagation delay from base station 105-b. Therefore, the timing determined for the NB PRACH resources by UE 115-c and UE 115-d may also be offset by the propagation delay.

At 425, UE 115-c and UE 115-d may determine frequency hopping patterns based on the NB PRACH information. UE 115-c and UE 115-d may use the determined frequency hopping patterns to generate a preamble sequence. In some cases, UE 115-c and UE 115-d may use the received NB PRACH information to determine the frequency hopping pattern (e.g., a linear hash function, a cyclic shift, or both) and may select a random number r, as described above with reference to FIG. 3.

At 430, UE 115-c and UE 115-d may select a preamble sequence based on the selected random number. UE 115-c and UE 115-d may generate and transmit preamble sequences 435-a and 435-b according to the determined frequency hopping pattern to base station 105-b. As discussed above, UE 115-c and UE 115-d may determine a timing for the NB PRACH resource that is offset by a propagation delay and the preamble sequence 435 transmissions may begin after the starting boundary of NB PRACH 300-a. The preamble sequence 435 transmissions may further experience propagation delays prior to reaching base station 105-b. Furthermore, preamble sequence 435-a may reach base station 105-b before preamble sequence 435-b based on environmental and channel conditions observed by UE 115-c and UE 115-d.

At 440, base station 105-b may detect the random access preambles based on the frequency hopping pattern advertised to and used by UE 115-c and UE 115-d. The base station 105-b may observe sets of resources corresponding to different frequency hopping patterns to determine the presence of a random access preamble, a time offset value, and/or a frequency offset value, as discussed above with reference to FIG. 3.

At 445, base station 105-b may use the detected random access preambles to determine timing offsets for subsequent transmissions by UE 115-c and UE 115-d, as discussed above with reference to FIG. 3. At 450, base station 105-b may transmit the timing offsets to UE 115-c and UE 115-d, which may adjust the timing of subsequent transmissions using the timing offset values. In this way, the base station 105-b may modify the timing of subsequent transmissions from UE 115-c and UE 115-d so that transmissions from UE 115-c and UE 115-d arrive at base station 105-d at substantially the same time (e.g., within a normal cyclic prefix ~4.7 µs of one another).

Figure 5:
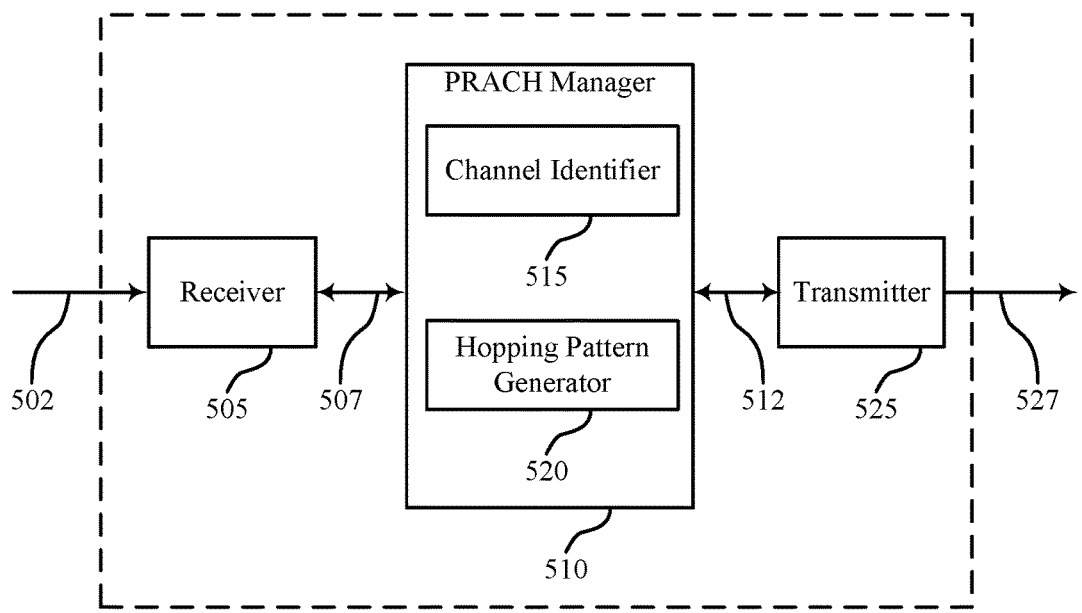
FIGS. 5-7 show block diagrams of a wireless device that supports NB PRACH frequency hopping patterns and detection schemes in accordance with various aspects of the present disclosure.

FIG. 5 shows a block diagram of a wireless device 500 configured for NB PRACH frequency hopping patterns and detection schemes in accordance with various aspects of the present disclosure. Wireless device 500 may be an example of aspects of a UE 115 or base station 105 as described with reference to FIGS. 1-4. Wireless device 500 may include a receiver 505, a PRACH manager 510, and a transmitter 525. PRACH manager 510 may include a channel identifier 515 and a hopping pattern generator 520. Wireless device 500 may also include a processor. Each of these components may be in communication with each other.

The receiver 505 may receive information such as packets, user data, or control information associated with various information channels (e.g., control channels, data channels, and information related to NB PRACH frequency hopping patterns and detection schemes, etc.) via communication link 502. Information received at the receiver 505 may be passed on to the PRACH manager 510 via communication link 507, and to other components of wireless device 500.

The PRACH manager 510 may identify a first portion and a second portion of a PRACH, wherein the first portion is associated with a first frequency hopping distance and the second portion is associated with a second frequency hopping distance. The PRACH manager 510 may determine a frequency hopping pattern for a random access preamble that comprises a first number of frequency hops associated with the first frequency hopping distance and a second number of frequency hops associated with the second frequency hopping distance. For example, the frequency hopping pattern may have the first number of frequency hops within the first portion and the second number of frequency hops within the second portion.

The channel identifier 515 may identify a first portion and a second portion of a PRACH, wherein the first portion is associated with a first frequency hopping distance and the second portion is associated with a second frequency hopping distance as described with reference to FIGS. 2-4. In some examples, the first portion comprises a first set of subcarriers that span a first sub-region of the PRACH and a second set of subcarriers that span a second sub-region of the PRACH, and wherein the first sub-region and the second sub-region are separated in frequency by a bandwidth of the second portion. In some examples, the first frequency hopping distance may be greater than the second frequency hopping distance, and wherein the first frequency hopping distance may be greater than or equal to the bandwidth of the second portion. In some examples, the PRACH may be partitioned into a plurality of subcarriers and preamble tone intervals, and wherein a subcarrier spacing of the plurality of subcarriers may be an integer divisor of a data channel subcarrier spacing for a cell associated with the PRACH. In some examples, the second portion may be partitioned into a plurality of sub-regions, each sub-region of the plurality of sub-regions comprising a plurality of subcarriers.

The hopping pattern generator 520 may determine a frequency hopping pattern for a random access preamble that comprises a first number of frequency hops associated with the first frequency hopping distance and a second number of frequency hops associated with the second frequency hopping distance as described with reference to FIGS. 2-4. For example, the frequency hopping pattern may include the first number of frequency hops within the first portion and the second number of frequency hops within the second portion. In some examples, the first number of frequency hops is equal to the second number of frequency hops. In some examples, the frequency hops of the first number of frequency hops are determined based at least in part on at least one of a pseudo-random linear hash function or a pseudo-random linear cyclic shift. In some examples, the frequency hops of the second number of frequency hops are determined based at least in part on at least one of a pseudo-random linear hash function or a pseudo-random linear cyclic shift and the number of subcarriers included in the each sub-region. In some cases, PRACH manager 510 may generate and pass a random access preamble signal to transmitter 525 via communication link 512. Alternatively, PRACH manager 510 may pass information indicative of how the random access preamble is to be constructed to transmitter 525, and the transmitter may generate the random access preamble based on the received information.

The transmitter 525 may transmit signals received from other components of wireless device 500 via communication link 527. In some examples, the transmitter 525 may be collocated with the receiver 505 in a transceiver module. The transmitter 525 may include a single antenna, or it may include a plurality of antennas. In some examples, a UE may use transmitter 525 to transmit a random access preamble according to the determined frequency hopping pattern via communication link 527. In some examples, a base station may use receiver 505 to receive a random access preamble transmitted according to a determined frequency hopping pattern via communication link 502.

Figure 6:
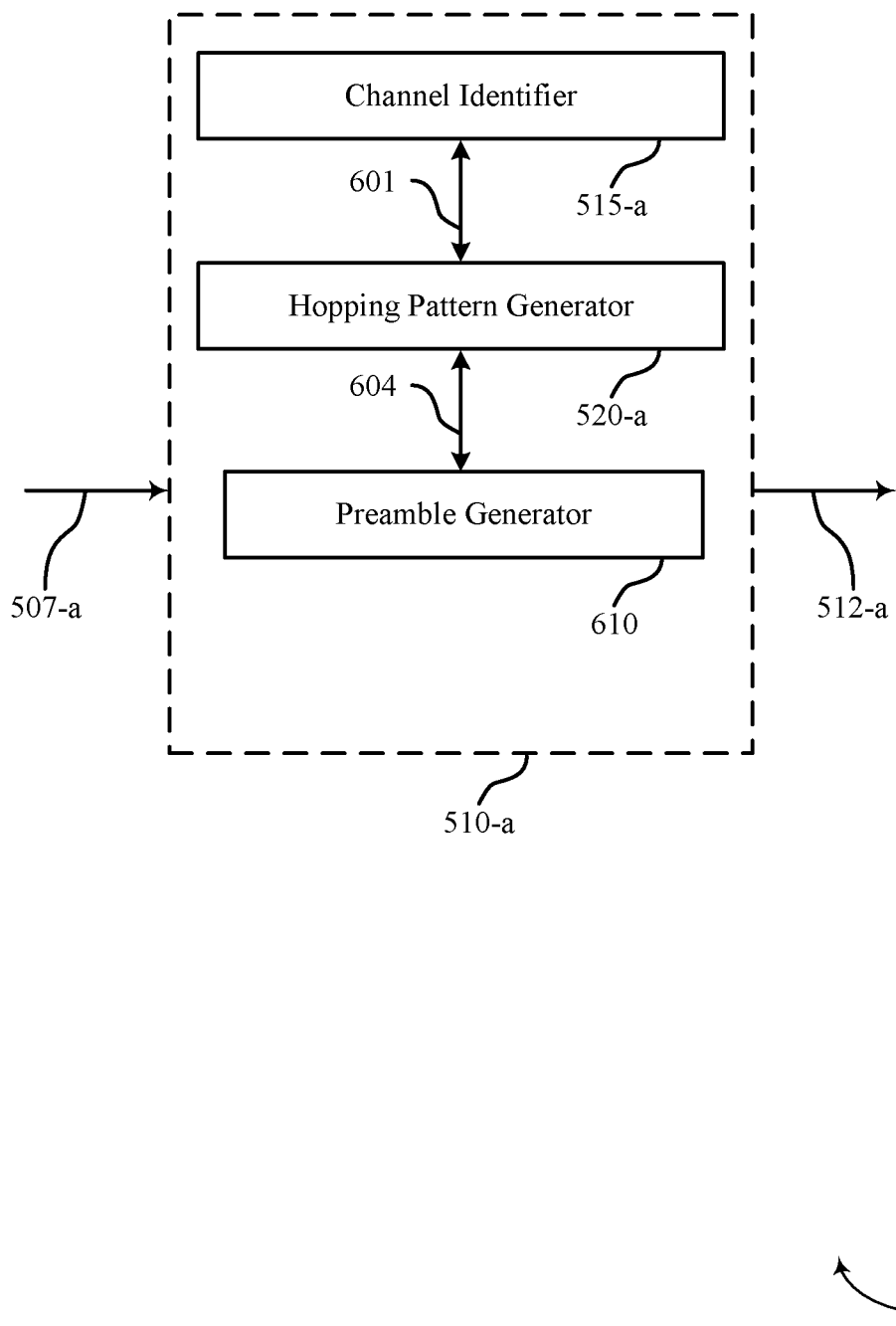

FIG. 6 shows a block diagram 600 of a PRACH manager 510-*a* which may be a component of a wireless device 500 for NB PRACH frequency hopping patterns and detection schemes in accordance with various aspects of the present disclosure. The PRACH manager 510-*a* may be an example of aspects of a PRACH manager 510 described with reference to FIG. 5. The PRACH manager 510-*a* may include a channel identifier 515-*a*, and a hopping pattern generator 520-*a*. Each of these modules may perform the functions described with reference to FIG. 5. The PRACH manager 510-*a* may also include a preamble generator 610.

In some cases, PRACH manager 510-*a* may be implemented at a UE, such as a UE 115 as described with reference to FIGS. 1-4. Information received at a receiver, such as receiver 505 in FIG. 5, may be passed to the PRACH manager 510-*a* via communication link 507-*a*. The channel identifier 515-*a* may identify a PRACH for communication (e.g., between a UE 115 and a base station 105). The channel identifier 515-*a* may pass PRACH Information 601 to the hopping pattern generator 520-*a*. The hopping pattern generator 520-*a* may determine or generate a frequency hopping pattern within the identified PRACH. In some cases, the frequency hopping pattern may include a first number of hops associated with a first hop distance and a second number of hops associated with a second hop distance. The frequency hopping pattern may also include a pseudo-random frequency hop distance. The pseudo-random frequency hop distances at each of multiple preamble tone intervals may be different from one device to another and may correspond to a difference between preambles transmitted by different devices. The hopping pattern generator 520-*a* may pass the frequency hopping pattern 604 to the preamble generator 610.

The preamble generator 610 may generate the random access preamble based on the frequency hopping pattern 604 to include a plurality of single-tone transmissions, each of the plurality of single-tone transmissions spanning one of the plurality of preamble tone intervals as described with reference to FIGS. 2-4. In some examples, PRACH manager 510-*a* may generate and pass a random access preamble signal to a transmitter, such as transmitter 525 in FIG. 5, via communication link 512-*a*.

Figure 7:
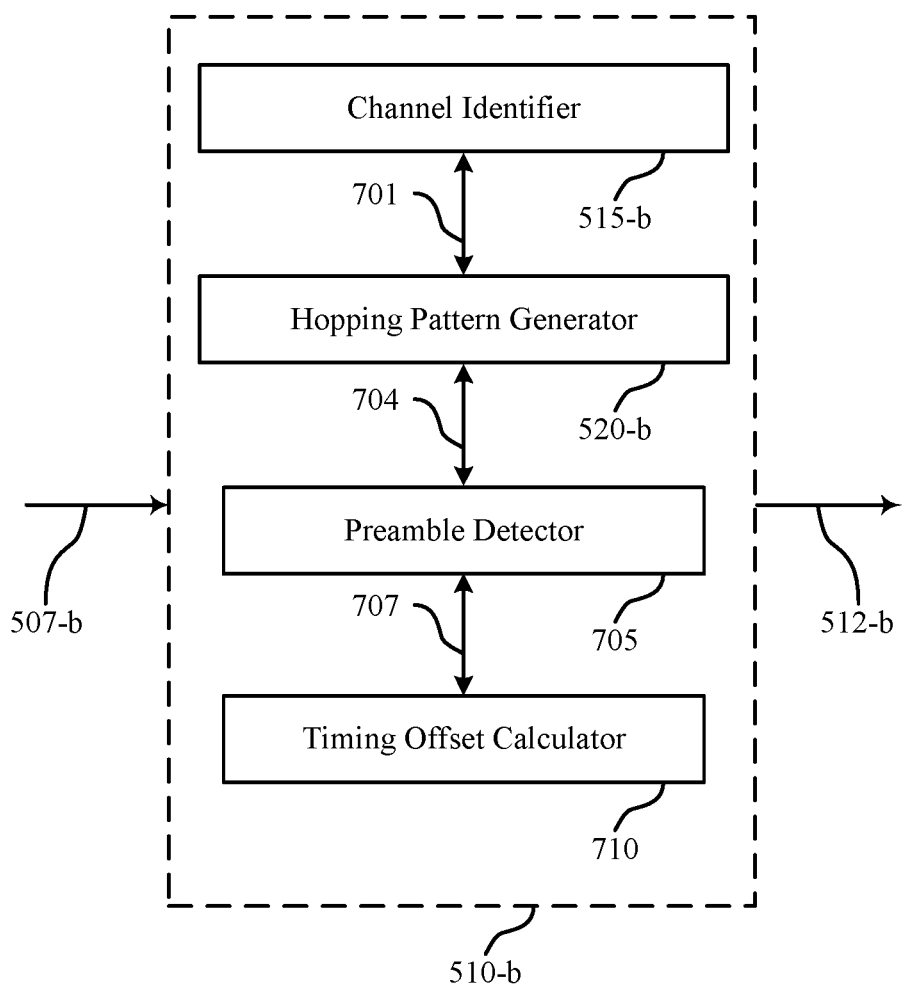

FIG. 7 shows a block diagram 700 of a PRACH manager 510-*b* which may be a component of a wireless device 500 for NB PRACH frequency hopping patterns and detection schemes in accordance with various aspects of the present disclosure. The PRACH manager 510-*b* may be an example of aspects of a PRACH manager 510 described with reference to FIG. 5. The PRACH manager 510-*b* may include a channel identifier 515-*b*, and a hopping pattern generator 520-*b*. Each of these modules may perform the functions described with reference to FIG. 5. The PRACH manager 510-*b* may also include a preamble detector 705 and a timing offset calculator 710.

In some cases, PRACH manager 510-*b* may be implemented at a base station, such as a base station 105 as described with reference to FIGS. 1-4. Information received at a receiver, such as receiver 505 in FIG. 5, may be passed to the PRACH manager 510-*b* via communication link 507-*b*. The channel identifier 515-*b* may identify a PRACH for communication (e.g., between a UE 115 and a base station 105). The channel identifier 515-*b* may pass PRACH Information 701 to the hopping pattern generator 520-*b*. The hopping pattern generator 520-*b* may determine or generate frequency hopping patterns within the identified PRACH. In some cases, the frequency hopping patterns may include a first number of hops associated with a first hop distance and a second number of hops associated with a second hop distance. The frequency hopping patterns may also include a pseudo-random frequency hop distance. The pseudo-random frequency hop distance for each of multiple preamble tone intervals may be different for different frequency hopping patterns. The frequency hopping patterns 704 may be passed on to the preamble detector 705.

The preamble detector 705 may detect random access preambles transmitted by NB-UEs 115 based at least in part on the frequency hopping patterns 704 as described with reference to FIGS. 2-4. For example, random access preambles transmitted by different devices may correlate to different frequency hopping patterns. In some examples, a preamble associated with a first device may include a first pattern of pseudo-random hopping distances and a preamble associated with a second device may include a second, different pattern of pseudo-random hopping distances. The detected preamble(s) 707 may be passed to the preamble detector 705. The timing offset calculator 710 may determine timing offset(s) for uplink transmissions from NB-UE(s) 115 based on the detected preamble(s) 707. The timing offset(s) may be based at least in part on comparisons of phase information in a plurality of tones of the detected random access preamble(s) as described with reference to FIGS. 2-4. In some examples, PRACH manager 510-*b* may detect and pass information related to a random access preamble to a transmitter, such as transmitter 525 in FIG. 5, via communication link 512-*b*.

Figure 8:
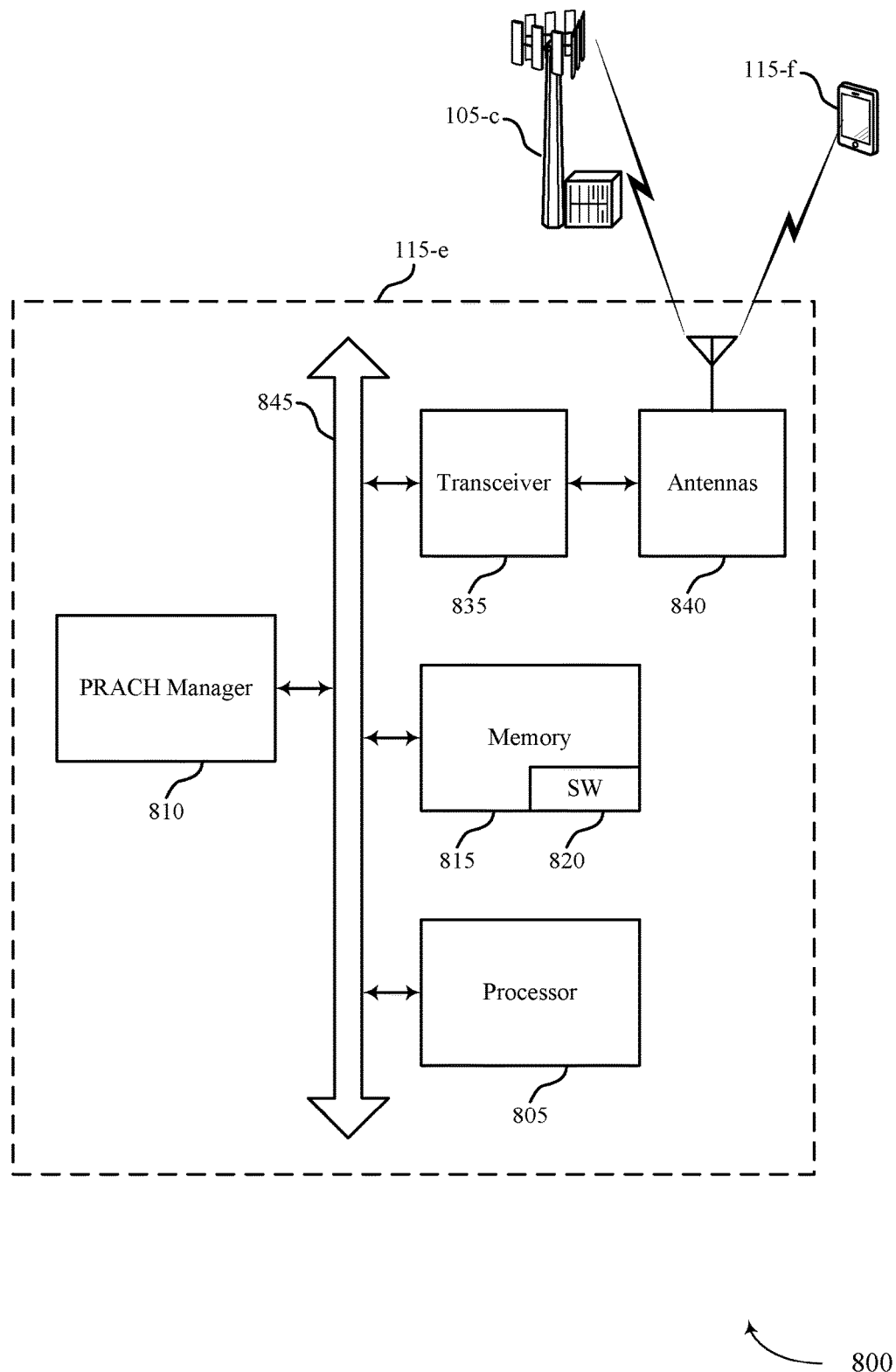
FIG. 8 illustrates a block diagram of a system including a device that supports NB PRACH frequency hopping patterns and detection schemes in accordance with various aspects of the present disclosure.

FIG. 8 shows a diagram of a system 800 including a UE 115-*e* configured for NB PRACH frequency hopping patterns and detection schemes in accordance with various aspects of the present disclosure. System 800 may include UE 115-*e*, which may be an example of a wireless device 500 or a UE 115 described with reference to FIGS. 1, 2, 5, and 7. UE 115-*e* may include a PRACH manager 810, which may be an example of a PRACH manager 510 described with reference to FIGS. 5-6. UE 115-*e* may also include components for bi-directional voice and data communications including components for transmitting communications and components for receiving communications. For example, UE 115-*e* may communicate bi-directionally with UE 115-*f* or base station 105-*c*.

UE 115-*e* may also include a processor 805, and memory 815 (including software (SW) 820), a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with a base station 105 or another UE 115. The transceiver 835 may include a modem to modulate the packets and provide the modulated packets to the antenna(s) 840 for transmission, and to demodulate packets received from the antenna(s) 840. While UE 115-e may include a single antenna 840, UE 115-e may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., NB PRACH frequency hopping patterns and detection schemes, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an application specific integrated circuit (ASIC), etc.)

Figure 9:
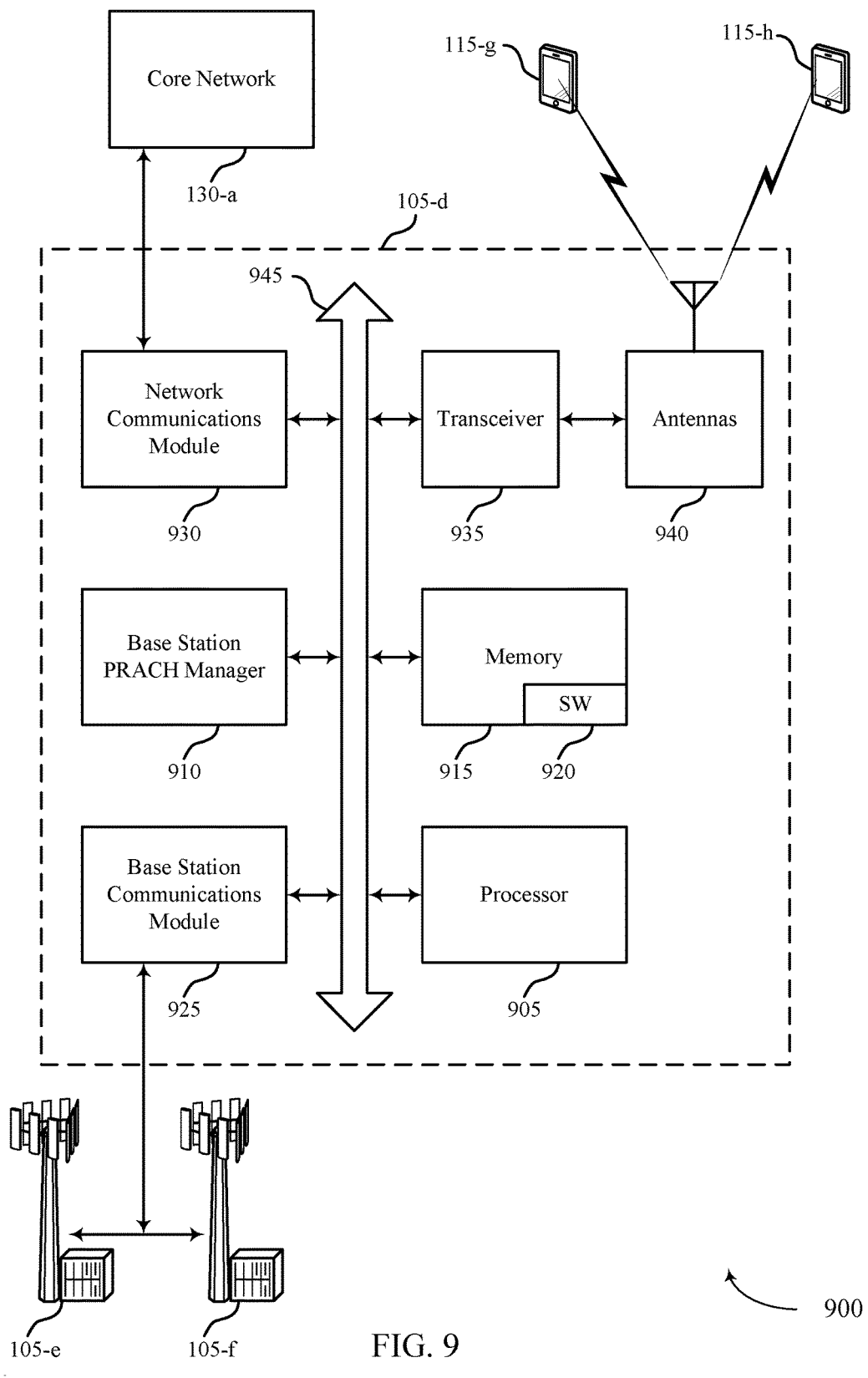
FIG. 9 illustrates a block diagram of a system including a base station that supports NB PRACH frequency hopping patterns and detection schemes in accordance with various aspects of the present disclosure.

FIG. 9 shows a diagram of a system 900 including a base station 105-d configured for NB PRACH frequency hopping patterns and detection schemes in accordance with various aspects of the present disclosure. System 900 may include base station 105-d, which may be an example of a wireless device 500 or a base station 105 described with reference to FIGS. 1, 2, 5, and 7-8. Base station 105-d may include a base station PRACH manager 910, which may be an example of a base station PRACH manager 910 described with reference to FIGS. 7-8. Base station 105-d may also include components for bi-directional voice and data communications including components for transmitting communications and components for receiving communications. For example, base station 105-d may communicate bi-directionally with UE 115-g or UE 115-h.

In some cases, base station 105-d may have one or more wired backhaul links. Base station 105-d may have a wired backhaul link (e.g., S1 interface, etc.) to the core network 130. Base station 105-d may also communicate with other base stations 105, such as base station 105-e and base station 105-f via inter-base station backhaul links (e.g., an X2 interface). Each of the base stations 105 may communicate with UEs 115 using the same or different wireless communications technologies. In some cases, base station 105-d may communicate with other base stations such as 105-e or 105-f utilizing base station communications module 925. In some examples, base station communications module 925 may provide an X2 interface within an LTE/LTE-A wireless communication network technology to provide communication between some of the base stations 105. In some examples, base station 105-d may communicate with other base stations through core network 130. In some cases, base station 105-d may communicate with the core network 130 through network communications module 930.

The base station 105-d may include a processor 905, memory 915 (including SW 920), transceiver 935, and antenna(s) 940, which each may be in communication, directly or indirectly, with one another (e.g., over bus system 945). The transceivers 935 may be configured to communicate bi-directionally, via the antenna(s) 940, with the UEs 115, which may be multi-mode devices. The transceiver 935 (or other components of the base station 105-d) may also be configured to communicate bi-directionally, via the antennas 940, with one or more other base stations (not shown). The transceiver 935 may include a modem configured to modulate the packets and provide the modulated packets to the antennas 940 for transmission, and to demodulate packets received from the antennas 940. The base station 105-d may include multiple transceivers 935, each with one or more associated antennas 940. The transceiver may be an example of a combined receiver 505 and transmitter 525 of FIG. 5.

The memory 915 may include RAM and ROM. The memory 915 may also store computer-readable, computer-executable software code 920 containing instructions that are configured to, when executed, cause the processor 905 to perform various functions described herein (e.g., NB PRACH frequency hopping patterns and detection schemes, selecting coverage enhancement techniques, call processing, database management, message routing, etc.). Alternatively, the software 920 may not be directly executable by the processor 905 but be configured to cause the computer, e.g., when compiled and executed, to perform functions described herein. The processor 905 may include an intelligent hardware device, e.g., a CPU, a microcontroller, an ASIC, etc. The processor 905 may include various special purpose processors such as encoders, queue processing modules, base band processors, radio head controllers, digital signal processor (DSPs), and the like.

The base station communications module 925 may manage communications with other base stations 105. In some cases, a communications management module may include a controller or scheduler for controlling communications with UEs 115 in cooperation with other base stations 105. For example, the base station communications module 925 may coordinate scheduling for transmissions to UEs 115 for various interference mitigation techniques such as beamforming or joint transmission.

The components of wireless device 500 and PRACH manager 510 may, individually or collectively, be implemented with at least one ASIC adapted to perform some or all of the applicable functions in hardware. Alternatively, the functions may be performed by one or more other processing units (or cores), on at least one integrated circuit (IC). In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 10:
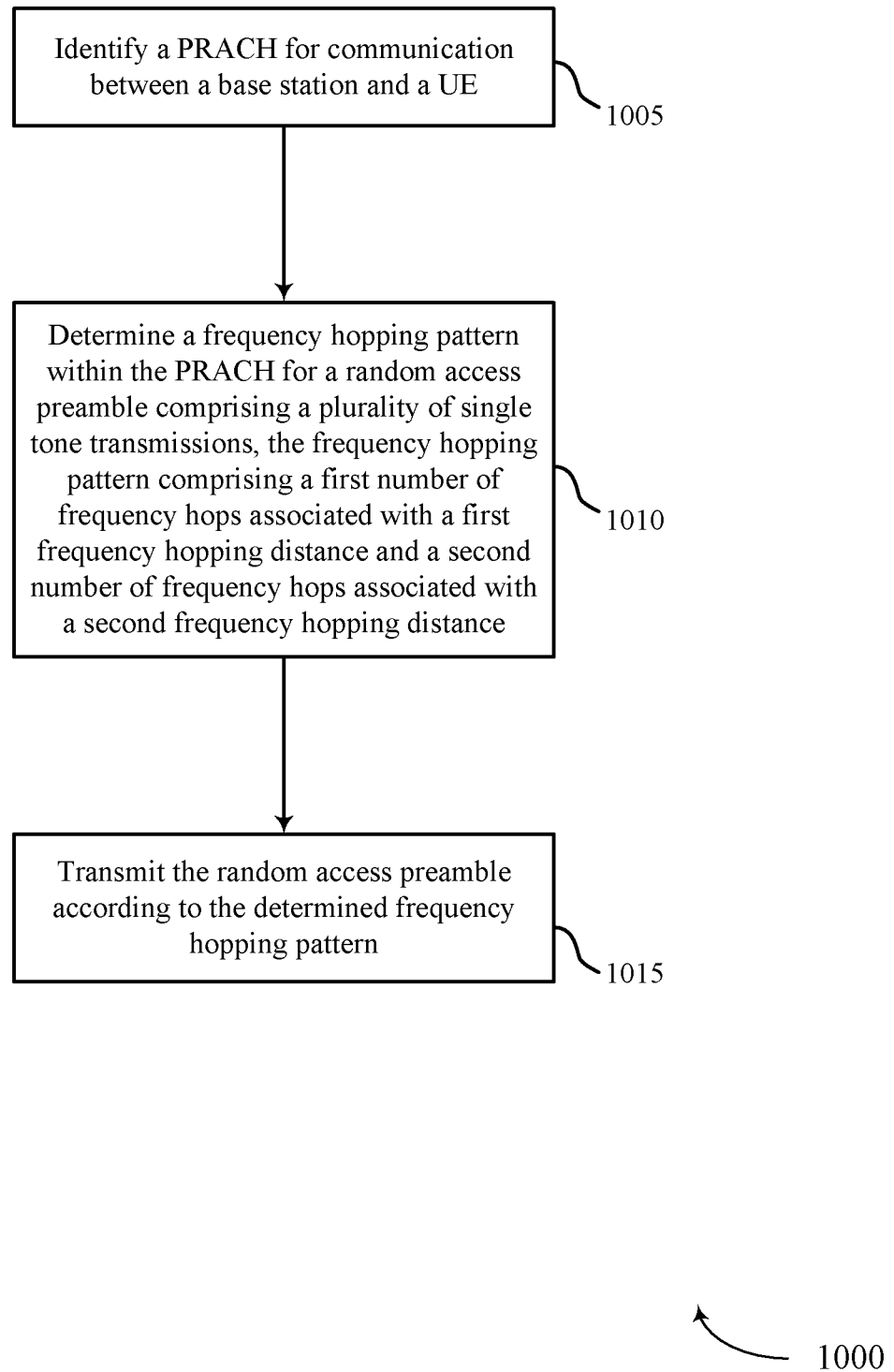
FIGS. 10 through 13 illustrate methods for NB PRACH frequency hopping patterns and detection schemes in accordance with various aspects of the present disclosure.

FIG. 10 shows a flowchart illustrating a method 1000 for NB PRACH frequency hopping patterns and detection schemes in accordance with various aspects of the present disclosure. The operations of method 1000 may be implemented by a UE 115 or its components as described with reference to FIGS. 1-9. For example, the operations of method 1000 may be performed by the PRACH manager 510 as described with reference to FIGS. 5-9. In some examples, a UE 115 may execute a set of codes to control the functional elements of the UE 115 to perform the functions described below. Additionally or alternatively, the UE 115 may perform aspects the functions described below using special-purpose hardware.

At block 1005, the UE 115 may identify a PRACH for communication between a base station 105 and the UE 115, as described with reference to FIGS. 2-4. In some cases, the PRACH may be partitioned into a plurality of subcarriers and a plurality of preamble tone intervals. A subcarrier spacing of the plurality of subcarriers may an integer divisor of a data channel subcarrier spacing for a cell associated with the PRACH. The PRACH may include a first portion associated with a first frequency hopping distance and a second portion associated with a second frequency hopping distance. The first portion may include a first set of subcarriers that span a first sub-region of the PRACH and a second set of subcarriers that span a second sub-region of the PRACH. The first sub-region and the second sub-region may be separated in frequency by a bandwidth of the second portion. In certain examples, the operations of block 1005 may be performed by the channel identifier 515 as described with reference to FIG. 5.

At block 1010, the UE 115 may determine a frequency hopping pattern within the PRACH for a random access preamble comprising a plurality of single tone transmissions. The plurality of single tone transmissions may span one of a plurality of preamble tone intervals. In some examples, the frequency hopping pattern includes a first number of frequency hops associated with the first frequency hopping distance and a second number of frequency hops associated with the second frequency hopping distance, as described with reference to FIGS. 2-4. In some cases, the first number of frequency hops may be different from the second number of frequency hops. At least one frequency hop may be determined based at least in part on a pseudo-random function. The random access preamble may be one of a plurality of random access preambles and different frequency hopping patterns for each of the plurality of random access preambles may be generated using a pseudo-random function. In certain examples, the operations of block 1010 may be performed by the hopping pattern generator 520 as described with reference to FIG. 5.

At block 1015, the UE 115 may transmit the random access preamble according to the determined frequency hopping pattern, as described with reference to FIGS. 2-4. In certain examples, the operations of block 1015 may be performed by the preamble generator 610 as described with reference to FIG. 6.

Figure 11:
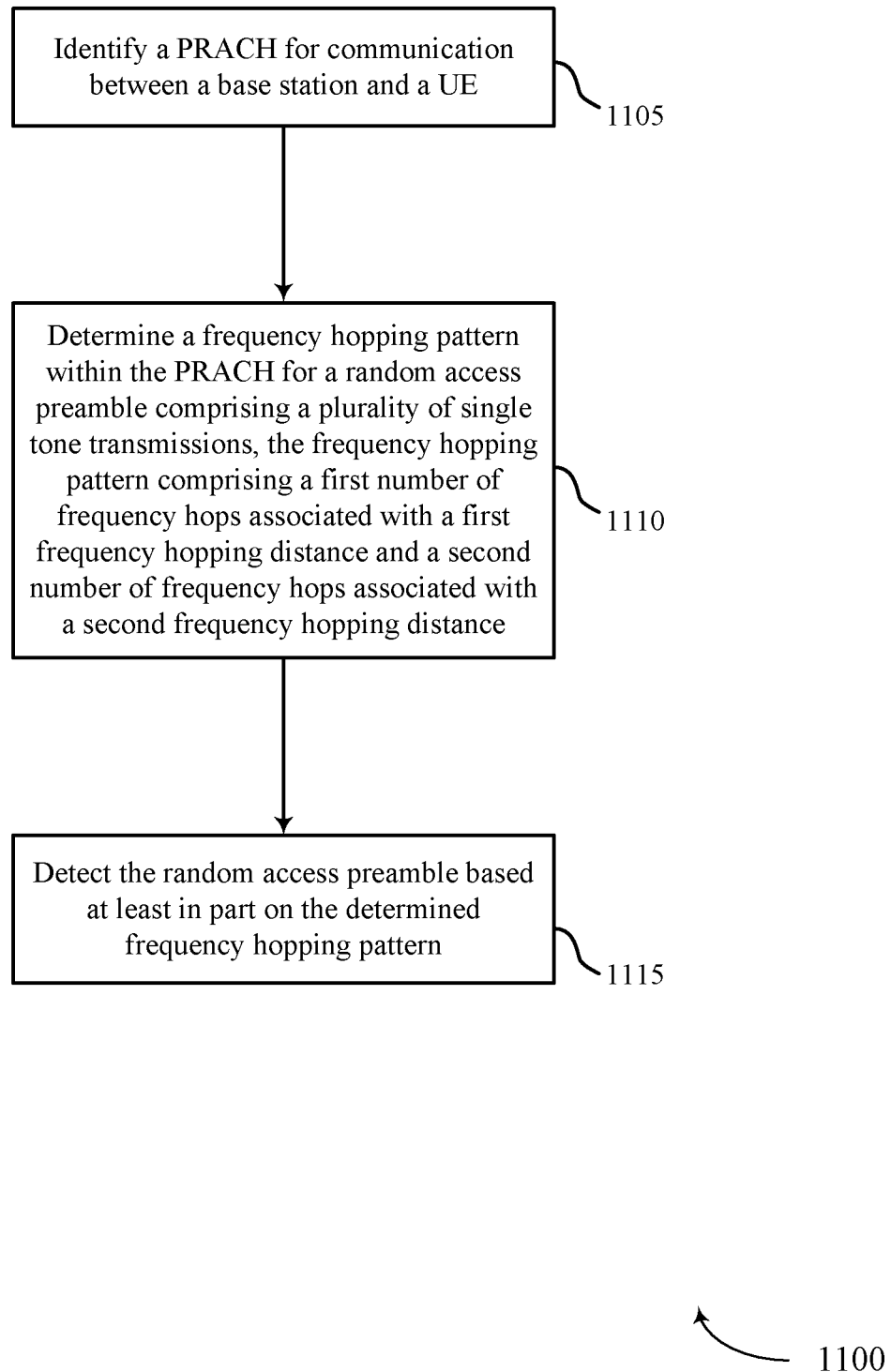

FIG. 11 shows a flowchart illustrating a method 1100 for NB PRACH frequency hopping patterns and detection schemes in accordance with various aspects of the present disclosure. The operations of method 1100 may be implemented by a base station 105 or its components as described with reference to FIGS. 1-9. For example, the operations of method 1100 may be performed by the PRACH manager 510 as described with reference to FIGS. 5-9. In some examples, a base station 105 may execute a set of codes to control the functional elements of the base station 105 to perform the functions described below. Additionally or alternatively, the base station 105 may perform aspects the functions described below using special-purpose hardware.

At block 1105, the base station 105 may identify a PRACH for communication between the base station 105 and a UE 115, as described with reference to FIGS. 2-4. In some cases, the PRACH may be partitioned into a plurality of subcarriers and a plurality of preamble tone intervals. A subcarrier spacing of the plurality of subcarriers may an integer divisor of a data channel subcarrier spacing for a cell associated with the PRACH. The PRACH may include a first portion associated with a first frequency hopping distance and a second portion associated with a second frequency hopping distance. The first portion may include a first set of subcarriers that span a first sub-region of the PRACH and a second set of subcarriers that span a second sub-region of the PRACH. The first sub-region and the second sub-region may be separated in frequency by a bandwidth of the second portion. In certain examples, the operations of block 1105 may be performed by the channel identifier 515 as described with reference to FIG. 5.

At block 1110, the base station 105 may determine a frequency hopping pattern within the PRACH for a random access preamble comprising a plurality of single tone transmissions, the frequency hopping pattern comprising a first number of frequency hops associated with a first frequency hopping distance and a second number of frequency hops associated with a second frequency hopping distance, as described with reference to FIGS. 2-4. In some cases, the first number of frequency hops may be different from the second number of frequency hops. At least one frequency hop may be determined based at least in part on a pseudo-random function. The random access preamble may be one of a plurality of random access preambles and different frequency hopping patterns for each of the plurality of random access preambles may be generated using a pseudo-random function. In certain examples, the operations of block 1110 may be performed by the hopping pattern generator 520 as described with reference to FIG. 5.

At block 1115, the base station 105 may detect the random access preamble based at least in part on the determined frequency hopping pattern, as described with reference to FIGS. 2-4. In certain examples, the operations of block 1115 may be performed by the preamble detector 705 as described with reference to FIG. 7.

Figure 12:
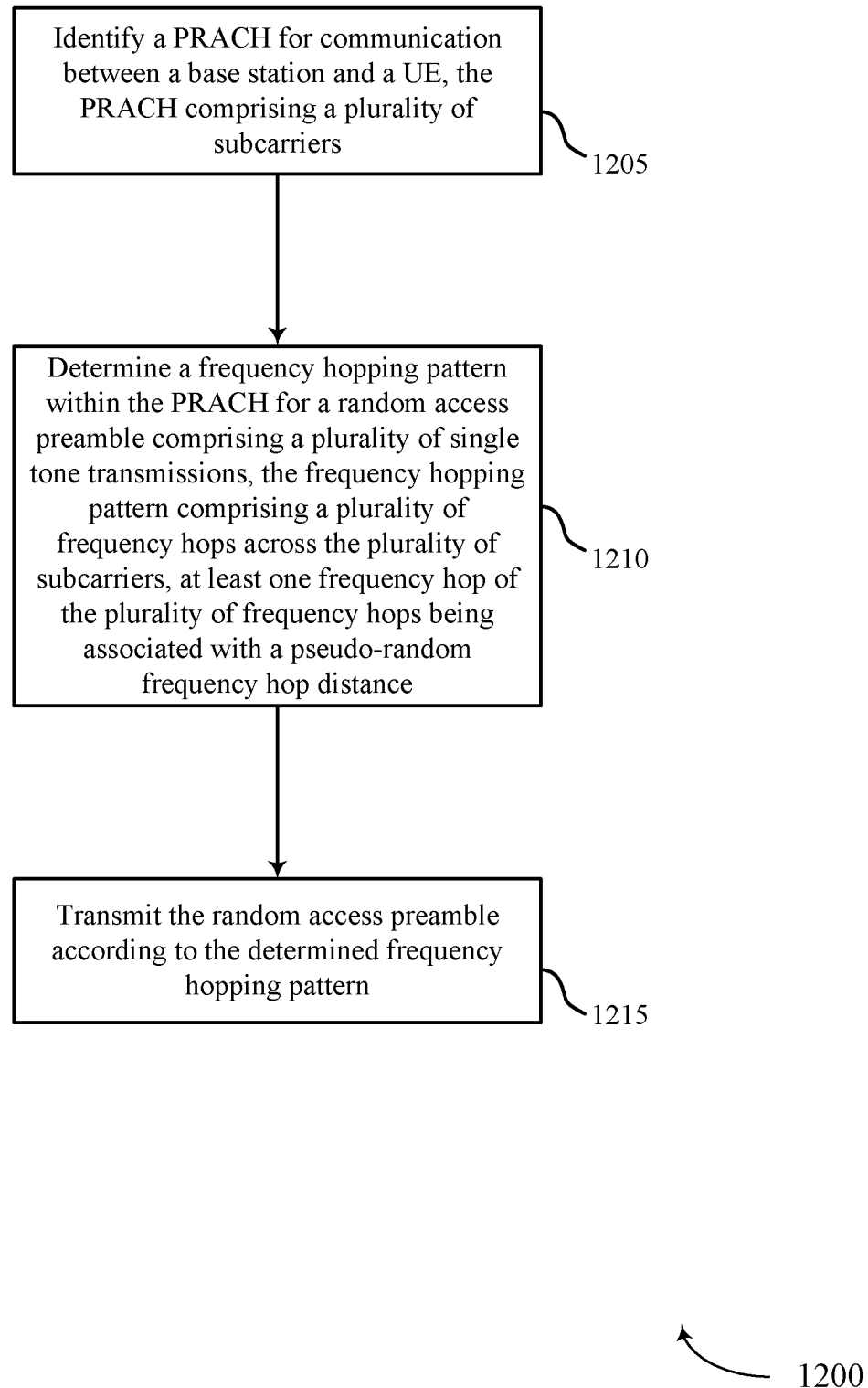

FIG. 12 shows a flowchart illustrating a method 1200 for NB PRACH frequency hopping patterns and detection schemes in accordance with various aspects of the present disclosure. The operations of method 1200 may be implemented by a UE 115 or its components as described with reference to FIGS. 1-9. For example, the operations of method 1200 may be performed by the PRACH manager 510 as described with reference to FIGS. 5-9. In some examples, a UE 115 may execute a set of codes to control the functional elements of the UE 115 to perform the functions described below. Additionally or alternatively, the UE 115 may perform aspects the functions described below using special-purpose hardware.

At block 1205, the UE 115 may identify a PRACH for communication between a base station 105 and the UE 115, as described with reference to FIGS. 2-4. In some cases, the PRACH may be include a plurality of subcarriers. In certain examples, the operations of block 1005 may be performed by the channel identifier 515 as described with reference to FIG. 5.

At block 1210, the UE 115 may determine a frequency hopping pattern within the PRACH for a random access preamble comprising a plurality of single tone transmissions, the frequency hopping pattern comprising a plurality of frequency hops across the plurality of subcarriers, at least one frequency hop of the plurality of frequency hops being associated with a pseudo-random frequency hop distance, as described with reference to FIGS. 2-4. In some cases, the pseudo-random frequency hop distance may be determined based on at least one of a pseudo-random linear hash function, or a pseudo-random linear cyclic shift or may be determined based on a number of subcarriers of the PRACH. In certain examples, the operations of block 1210 may be performed by the hopping pattern generator 520 as described with reference to FIG. 5.

At block 1215, the UE 115 may transmit the random access preamble according to the determined frequency hopping pattern, as described with reference to FIGS. 2-4. In certain examples, the operations of block 1215 may be performed by the preamble generator 610 as described with reference to FIG. 6.

Figure 13:
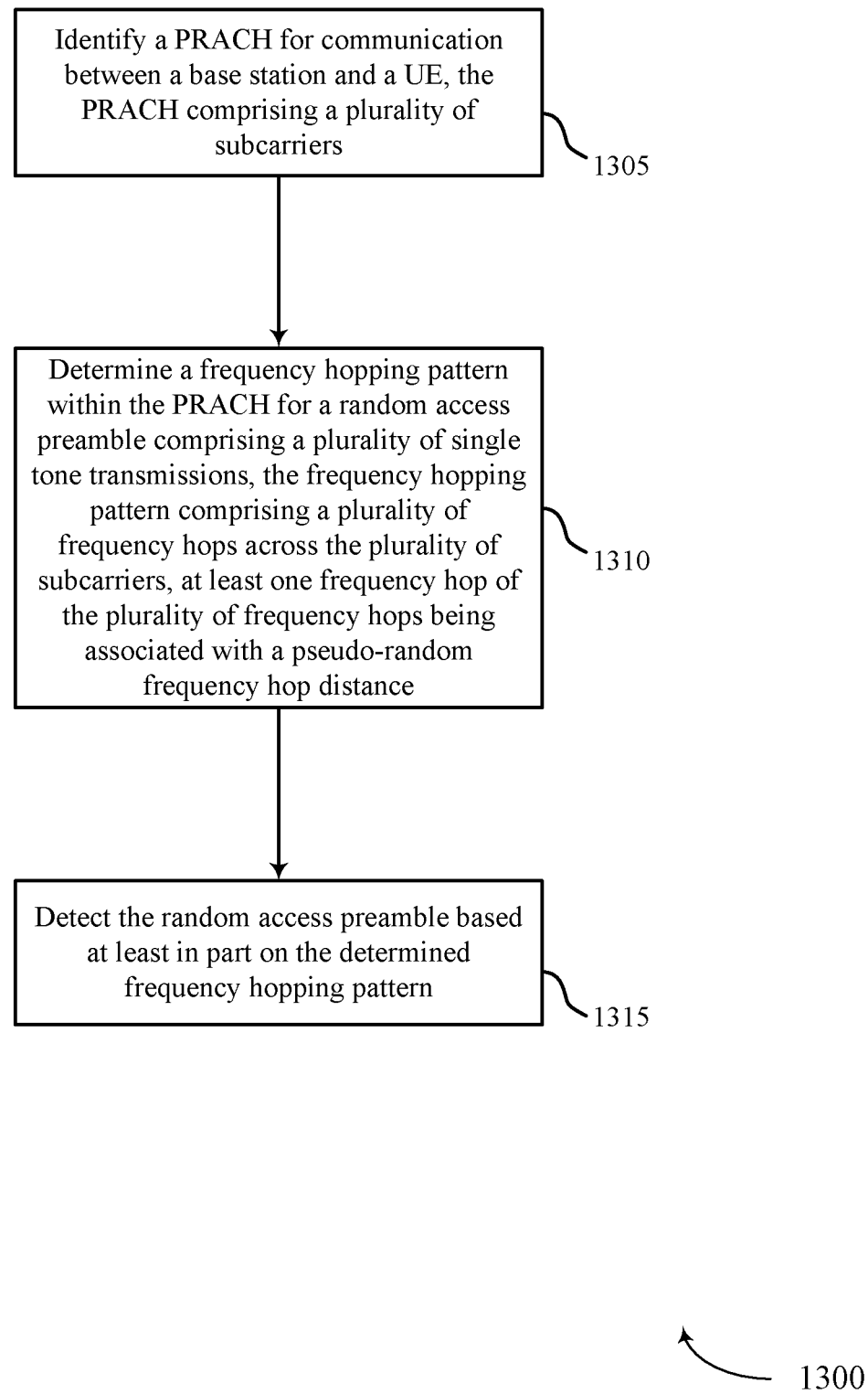

FIG. 13 shows a flowchart illustrating a method 1300 for NB PRACH frequency hopping patterns and detection schemes in accordance with various aspects of the present disclosure. The operations of method 1300 may be implemented by a base station 105 or its components as described with reference to FIGS. 1-9. For example, the operations of method 1300 may be performed by the PRACH manager 510 as described with reference to FIGS. 5-9. In some examples, a base station 105 may execute a set of codes to control the functional elements of the base station 105 to perform the functions described below. Additionally or alternatively, the base station 105 may perform aspects the functions described below using special-purpose hardware.

At block 1305, the UE 115 may identify a PRACH for communication between the base station 105 and a UE 115, as described with reference to FIGS. 2-4. In some cases, the PRACH may be include a plurality of subcarriers. In certain examples, the operations of block 1305 may be performed by the channel identifier 515 as described with reference to FIG. 5.

At block 1310, the base station 105 may determine a frequency hopping pattern within the PRACH for a random access preamble comprising a plurality of single tone transmissions, the frequency hopping pattern comprising a plurality of frequency hops across the plurality of subcarriers, at least one frequency hop of the plurality of frequency hops being associated with a pseudo-random frequency hop distance, as described with reference to FIGS. 2-4. In some cases, the pseudo-random frequency hop distance may be determined based on at least one of a pseudo-random linear hash function, or a pseudo-random linear cyclic shift or may be determined based on a number of subcarriers of the PRACH. In certain examples, the operations of block 1310 may be performed by the hopping pattern generator 520 as described with reference to FIG. 5.

At block 1315, the base station 105 may detect the random access preamble based at least in part on the determined frequency hopping pattern, as described with reference to FIGS. 2-4. Detecting the random access preamble may include mapping the phase information for the plurality of tones to a sequence based at least in part on respective preamble tone intervals and respective subcarriers of the plurality of single tone transmissions, and performing a frequency transform on the mapped sequence. In some cases, detecting the random access preamble may include mapping differential phase information between two or more tones of the plurality of tones to a sequence based at least in part on the respective preamble tone intervals and respective subcarriers of the plurality of single tone transmissions, and performing a frequency transform on the mapped sequence. In certain examples, the operations of block 1315 may be performed by the preamble detector 705 as described with reference to FIG. 7.

In some examples, the base station 105 may determine a timing offset for uplink transmissions from the UE based at least in part on phase information in a plurality of tones of the random access preamble detected at 1315. In some examples, determining the timing offset may include identifying a location of a maximum value of an output of the frequency transform of the mapped sequence. Detecting the random access preamble may include comparing the maximum value with a threshold. In certain examples, determining the timing offset may be performed by the timing offset calculator 710 as described with reference to FIG. 7.

Thus, methods 1000, 1100, 1200, and 1300 may provide for NB PRACH frequency hopping patterns and detection schemes. It should be noted that methods 1000, 1100, 1200, and 1300 describe possible implementations, and that the operations and the steps may be rearranged or otherwise modified such that other implementations are possible. In some examples, aspects from two or more of the methods 1000, 1100, 1200, and 1300 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). 3GPP LTE and LTE-A are new releases of UMTS that use E-UTRA. UTRA, E-UTRA, The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including such networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications systems 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using FDD (e.g., using paired spectrum resources) or TDD operation (e.g., using unpaired spectrum resources). Frame structures may be defined for FDD (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
identifying a physical random access channel (PRACH) for communication between a base station and a user equipment (UE);
and determining a frequency hopping pattern within the PRACH for a random access preamble comprising a plurality of single subcarrier transmissions, the frequency hopping pattern comprising frequency hops associated with a first frequency hopping distance within the PRACH and frequency hops associated with a second frequency hopping distance within the PRACH, wherein the first frequency hopping distance is larger than the second frequency hopping distance.

2. The method of claim 1, further comprising:
transmitting, by the UE, the random access preamble according to the determined frequency hopping pattern.

3. The method of claim 1, wherein a number of frequency hops associated with the first frequency hopping distance is different from a number of frequency hops associated with the second frequency hopping distance.

4. The method of claim 1, wherein the determined frequency hopping pattern comprises at least one frequency hop determined based at least in part on a pseudo-random function.

5. The method of claim 1, wherein the random access preamble is one of a plurality of random access preambles, and wherein non-colliding frequency hopping patterns for the plurality of random access preambles are generated using a pseudo-random function.

6. The method of claim 1, wherein the PRACH comprises a first portion associated with the first frequency hopping distance and a second portion associated with the second frequency hopping distance.

7. The method of claim 6, wherein the first portion comprises a first set of subcarriers that span a first sub-region of the PRACH and a second set of subcarriers that span a second sub-region of the PRACH, and wherein the first sub-region and the second sub-region are separated in frequency by a bandwidth of the second portion.

8. The method of claim 1, wherein the PRACH is partitioned into a plurality of subcarriers and a plurality of preamble tone intervals, and wherein a subcarrier spacing of the plurality of subcarriers is an integer divisor of a data channel subcarrier spacing for a cell associated with the PRACH.

9. The method of claim 8, wherein each of the plurality of single subcarrier transmissions spans one of the plurality of preamble tone intervals.

10. The method of claim 1, further comprising:
detecting, by a base station, the random access preamble based at least in part on the determined frequency hopping pattern.

11. An apparatus for wireless communication, comprising:
means for identifying a physical random access channel (PRACH) for communication between a base station and a user equipment (UE);
and means for determining a frequency hopping pattern within the PRACH for a random access preamble comprising a plurality of single subcarrier transmissions, the frequency hopping pattern comprising frequency hops associated with a first frequency hopping distance within the PRACH and frequency hops associated with a second frequency hopping distance within the PRACH, wherein the first frequency hopping distance is larger than the second frequency hopping distance.

12. The apparatus of claim 11, further comprising:
means for transmitting, by the UE, the random access preamble according to the determined frequency hopping pattern.

13. The apparatus of claim 11, wherein a number of frequency hops associated with the first frequency hopping distance is different from a number of frequency hops associated with the second frequency hopping distance.

14. The apparatus of claim 11, wherein the determined frequency hopping pattern comprises at least one frequency hop determined based at least in part on a pseudo-random function.

15. The apparatus of claim 11, wherein the random access preamble is one of a plurality of random access preambles, and wherein non-colliding frequency hopping patterns for the plurality of random access preambles are generated using a pseudorandom function.

16. The apparatus of claim 11, wherein the PRACH comprises a first portion associated with the first frequency hopping distance and a second portion associated with the second frequency hopping distance.

17. The apparatus of claim 16, wherein the first portion comprises a first set of subcarriers that span a first sub-region of the PRACH and a second set of subcarriers that span a second sub-region of the PRACH, and wherein the first sub-region and the second sub-region are separated in frequency by a bandwidth of the second portion.

18. The apparatus of claim 11, wherein the PRACH is partitioned into a plurality of subcarriers and a plurality of preamble tone intervals, and wherein a subcarrier spacing of the plurality of subcarriers is an integer divisor of a data channel subcarrier spacing for a cell associated with the PRACH.

19. The apparatus of claim 18, wherein each of the plurality of single subcarrier transmissions spans one of the plurality of preamble tone intervals.

20. The apparatus of claim 11, further comprising:
means for detecting, by a base station, the random access preamble based at least in part on the determined frequency hopping pattern.

21. An apparatus for wireless communication, in a system comprising:
a processor;
memory in electronic communication with the processor; and instructions stored in the memory and operable, when executed by the processor, to cause the apparatus to:
identify a physical random access channel (PRACH) for communication between a base station and a user equipment (UE);
and determine a frequency hopping pattern within the PRACH for a random access preamble comprising a plurality of single subcarrier transmissions, the frequency hopping pattern comprising frequency hops associated with a first frequency hopping distance within the PRACH and frequency hops associated with a second frequency hopping distance within the PRACH, wherein the first frequency hopping distance is larger than the second frequency hopping distance.

22. The apparatus of claim 21, wherein the instructions are further executable by the processor to:
transmit, by the UE, the random access preamble according to the determined frequency hopping pattern.

23. The apparatus of claim 21, wherein a number of frequency hops associated with the first frequency hopping distance is different from a number of frequency hops associated with the second frequency hopping distance.

24. The apparatus of claim 21, wherein the determined frequency hopping pattern comprises at least one frequency hop determined based at least in part on a pseudo-random function.

25. The apparatus of claim 21, wherein the random access preamble is one of a plurality of random access preambles, and wherein non-colliding frequency hopping patterns for the plurality of random access preambles are generated using a pseudo-random function.

26. The apparatus of claim 21, wherein the PRACH comprises a first portion associated with the first frequency hopping distance and a second portion associated with the second frequency hopping distance.

27. The apparatus of claim 26, wherein the first portion comprises a first set of subcarriers that span a first sub-region of the PRACH and a second set of subcarriers that span a second sub-region of the PRACH, and wherein the first sub-region and the second sub-region are separated in frequency by a bandwidth of the second portion.

28. The apparatus of claim 21, wherein the PRACH is partitioned into a plurality of subcarriers and a plurality of preamble tone intervals, and wherein a subcarrier spacing of the plurality of subcarriers is an integer divisor of a data channel subcarrier spacing for a cell associated with the PRACH.

29. The apparatus of claim 28, wherein each of the plurality of single subcarrier transmissions spans one of the plurality of preamble tone intervals.

30. The apparatus of claim 21, wherein the instructions are further executable by the processor to:
detect, by a base station, the random access preamble based at least in part on the determined frequency hopping pattern.

31. A non-transitory computer readable medium storing code for wireless communication, the code comprising instructions executable by a processor to:
identify a physical random access channel (PRACH) for communication between a base station and a user equipment (UE);
and determine a frequency hopping pattern within the PRACH for a random access preamble comprising a plurality of single subcarrier transmissions, the frequency hopping pattern comprising frequency hops associated with a first frequency hopping distance within the PRACH and frequency hops associated with a second frequency hopping distance within the PRACH, wherein the first frequency hopping distance is larger than the second frequency hopping distance.

\* \* \* \* \*